US010795697B2

(12) United States Patent
He

(10) Patent No.: US 10,795,697 B2
(45) Date of Patent: Oct. 6, 2020

(54) METHOD AND DEVICE FOR MANAGING DESKTOP

(71) Applicant: BEIJING KINGSOFT INTERNET SECURITY SOFTWARE CO., LTD., Beijing (CN)

(72) Inventor: Sini He, Beijing (CN)

(73) Assignee: BEIJING KINGSOFT INTERNET SECURITY SOFTWARE CO., LTD., Beijing (CN)

(*) Notice: Subject to any disclaimer, the term of this patent is extended or adjusted under 35 U.S.C. 154(b) by 0 days.

(21) Appl. No.: 15/965,516

(22) Filed: Apr. 27, 2018

(65) Prior Publication Data
US 2018/0336047 A1 Nov. 22, 2018

(30) Foreign Application Priority Data

May 16, 2017 (CN) .......................... 2017 1 0347029

(51) Int. Cl.
| G06F 9/451 | (2018.01) |
|---|---|
| G06F 3/0481 | (2013.01) |
| G06F 9/445 | (2018.01) |
| H04L 29/08 | (2006.01) |
| G06F 3/0482 | (2013.01) |

(52) U.S. Cl.
CPC ............ G06F 9/451 (2018.02); G06F 3/0481 (2013.01); G06F 3/0482 (2013.01); G06F 3/04817 (2013.01); G06F 9/4451 (2013.01); H04L 67/306 (2013.01)

(58) Field of Classification Search
CPC .... G06F 9/451; G06F 3/04817; G06F 3/0482; G06F 9/4451; H04L 67/306
See application file for complete search history.

(56) References Cited

U.S. PATENT DOCUMENTS 6,232,972 B1 * 5/2001 Arcuri ..................... G06F 9/453
715/815
6,785,822 B1 * 8/2004 Sadhwani-Tully ..........................
G06F 21/6281
713/1

(Continued)

FOREIGN PATENT DOCUMENTS

| CN | 103514496 | 1/2014 |
| CN | 103544020 | 1/2014 |
| CN | 106484504 | 3/2017 |

*Primary Examiner* — Mandrita Brahmachari
(74) *Attorney, Agent, or Firm* — Hodgson Russ LLP

(57) ABSTRACT

Embodiments of the present disclosure provide a method and a device for managing a desktop. With the method, the desktop management request sent by the mobile terminal is obtained by the server, in which the desktop management request carries user information and desktop application information; the management rule corresponding to the desktop management request is selected from the preset rule base by the server; the user interest feature information corresponding to the user information is analyzed according to the management rule, and the desktop application information is planned according to the user interest feature information to generate the desktop application arrangement information; and the desktop application arrangement information is sent to the mobile terminal, such that the mobile terminal arranges a plurality of application icons on the desktop according to the desktop application arrangement information.

15 Claims, 10 Drawing Sheets

(56) References Cited

U.S. PATENT DOCUMENTS

| | | | |
|---|---|---|---|
| 6,885,387 B1* | 4/2005 | Machida | G06F 3/0481 709/224 |
| 7,251,687 B1* | 7/2007 | McCullough | G06Q 30/02 709/224 |
| 9,374,610 B1* | 6/2016 | Chang | H04N 21/4312 |
| 9,408,143 B2* | 8/2016 | Walker | H04W 52/0212 |
| 2007/0067734 A1* | 3/2007 | Cunningham | G06F 3/04817 715/779 |
| 2007/0083827 A1* | 4/2007 | Scott | G06F 9/451 715/811 |
| 2008/0250043 A1* | 10/2008 | Sato | G11B 27/105 |
| 2010/0169836 A1* | 7/2010 | Stallings | G06F 3/04817 715/848 |
| 2010/0205559 A1* | 8/2010 | Rose | G06F 3/04817 715/781 |
| 2012/0191844 A1* | 7/2012 | Boyns | G06Q 30/02 709/224 |
| 2012/0297304 A1* | 11/2012 | Maxwell | H04M 1/72569 715/728 |
| 2013/0181941 A1* | 7/2013 | Okuno | G06F 3/041 345/174 |
| 2014/0201655 A1* | 7/2014 | Mahaffey | G06F 3/04817 715/765 |
| 2014/0201681 A1* | 7/2014 | Mahaffey | H04M 1/72569 715/846 |
| 2014/0203999 A1* | 7/2014 | Shim | G06F 3/1454 345/2.2 |
| 2014/0365895 A1* | 12/2014 | Magahern | G06F 3/016 715/727 |
| 2015/0121308 A1* | 4/2015 | Zhong | G06F 3/04817 715/811 |
| 2015/0181531 A1* | 6/2015 | Zajac | G06F 1/3212 455/574 |
| 2015/0200879 A1* | 7/2015 | Wu | H04L 51/046 715/758 |
| 2016/0036741 A1* | 2/2016 | Abadir | H04L 51/063 709/204 |
| 2016/0117079 A1* | 4/2016 | Huang | G06F 3/0483 715/738 |
| 2016/0300191 A1* | 10/2016 | Leslie | G06Q 10/10 |
| 2017/0093785 A1* | 3/2017 | Kii | G06F 13/00 |
| 2017/0228563 A1* | 8/2017 | Lee | G06Q 50/10 |
| 2017/0230848 A1* | 8/2017 | Brouillette | H04W 24/08 |

* cited by examiner

METHOD AND DEVICE FOR MANAGING DESKTOP

CROSS-REFERENCE TO RELATED APPLICATIONS

This application claims priority to and benefits of Chinese Patent Application Serial No. 201710347029.0, filed with the State Intellectual Property Office of P. R. China on May 16, 2017, the entire content of which is incorporated herein by reference.

FIELD

The present disclosure relates to a field of computer application program, and more particularly, to a method and a device for managing a desktop.

BACKGROUND

With the rapid development of mobile communication technology, increasing users may install increasing application programs (or applications, APPs for short) in terminals. The users may often adjust icons of the APPs on third-party desktops manually according to personal requirements. For instance, the user may install a third-party desktop (not a system desktop) in a terminal (for example, a mobile phone or a tablet) and set the third-party desktop as a default desktop to replace the system desktop. Generally, third-party mobile phone desktops may have richer functions than mobile phone system desktops. For example, the users may customize their mobile phone desktops by setting a series of desktop display effects. Further, some third-party mobile phone desktops may have functions that can bring completely different visual display effects to the users, such as theme replacement and the like.

However, in the related art, during a process of initializing the third-party desktop, it is usually necessary to read APP contents loaded on a previous desktop in advance and simply classify the obtained APP contents, for example, into categories of socials, games, tools, etc. in a local database, then the classified APPs are arranged on the third-party desktop to display. With this kind of classification, desktop icons in the mobile phone can only be roughly arranged, and display effects presented by the icons usually are relatively simple. That is, APP layouts obtained by all users are not quite different from each other and arrangements are relatively fixed.

However, the APP layout is a very personalized icon presentation form. Different users may prefer different layouts. For example, a user A likes to play games and a user B prefers to social applications. The above arrangement obviously cannot satisfy most users for being not able to meet interest requirements of the users. Therefore, the users may need to manually adjust their desktop APP layouts several times, thus requiring cumbersome layout operations.

SUMMARY

Embodiments of the present disclosure provide a method for managing a desktop, the method including:
obtaining a desktop management request sent by a mobile terminal, in which the desktop management request carries user information and desktop application information;
selecting a management rule corresponding to the desktop management request from a preset rule base;
analyzing user interest feature information corresponding to the user information according to the management rule, and planning the desktop application information according to the user interest feature information to generate desktop application arrangement information; and
sending the desktop application arrangement information to the mobile terminal, such that the mobile terminal arranges a plurality of application icons on the desktop according to the desktop application arrangement information.

Embodiments of the present disclosure provide a device for managing a desktop, which includes a processor, a network interface, and a memory, in which:
the processor is connected to the network interface and the memory, the network interface is configured to communicate with a mobile terminal, the memory is configured to store program codes, and the processor is configured to call the program codes to perform following acts of:
  obtaining a desktop management request sent by the mobile terminal, wherein the desktop management request carries user information and desktop application information;
  selecting a management rule corresponding to the desktop management request from a preset rule base;
  analyzing user interest feature information corresponding to the user information according to the management rule, and planning the desktop application information according to the user interest feature information to generate desktop application arrangement information; and
  sending the desktop application arrangement information to the mobile terminal, such that the mobile terminal arranges a plurality of application icons on the desktop according to the desktop application arrangement information.

Embodiments of the present disclosure provide a computer-readable storage medium, the storage medium is stored with a computer program, the computer program includes program instructions which when executed by a processor, performs acts of:
obtaining a desktop management request sent by a mobile terminal, wherein the desktop management request carries user information and desktop application information;
selecting a management rule corresponding to the desktop management request from a preset rule base;
analyzing user interest feature information corresponding to the user information according to the management rule, and planning the desktop application information according to the user interest feature information to generate desktop application arrangement information; and
sending the desktop application arrangement information to the mobile terminal, such that the mobile terminal arranges a plurality of application icons on the desktop according to the desktop application arrangement information.

BRIEF DESCRIPTION OF THE DRAWINGS

In order to give a more clearly illustration of technical solutions of embodiments of the present disclosure or the related art, drawings will be used in descriptions of the embodiments or the related art are introduced briefly as follows. Obviously, the drawings described below are only some embodiments of the present disclosure; other drawings can be obtained by those skilled in the art according to these drawings without creative labors.

DETAILED DESCRIPTION

Technical solutions of embodiments of the present disclosure will be described clearly and completely hereafter with reference to drawings of the embodiments of the present disclosure, obviously, the described embodiments are just part of the embodiments of the present disclosure but not all the embodiments. All the other embodiments obtained by those skilled in the art on the basis of the embodiments of the present disclosure without creative labors will be within the scope of the present disclosure.

In the specification, the claims and the drawings of the present disclosure, terms "include" and "comprise" and any deformations thereof are intend to cover an non-exclusive inclusion. For example, a process, method, system or product including a set of steps or units is not limited to listed steps or units but may alternatively include other unlisted steps or units, or alternatively further include other steps or units inherently in the process, method, system or product.

The method for managing a desktop according to embodiments of the present disclosure should be implemented based on a computer program which is executable by a computer system of von Neumann architecture. The computer program may be integrated into an application or work as an independent tool type application. The computer system may be a personal computer, a tablet, a laptop, a smart phone or other terminal devices.

Details will be described as follows.

Figure 1:
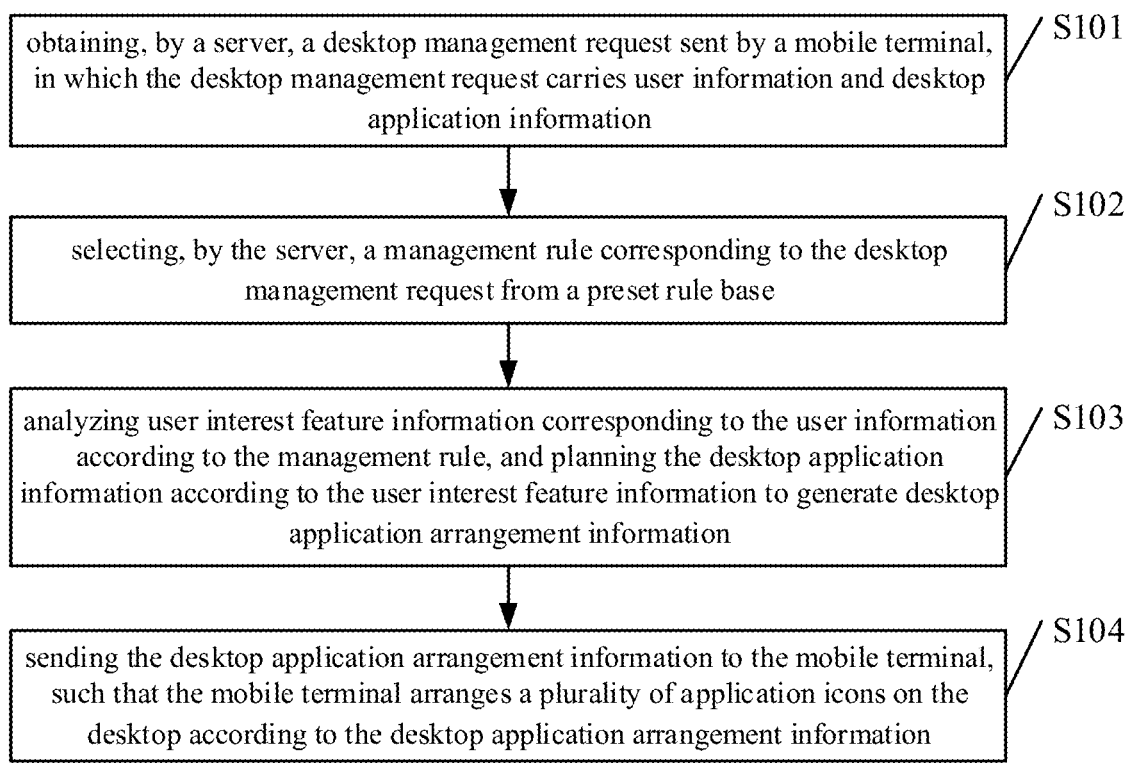
FIG. 1 is a flow chart illustrating a method for managing a desktop according to an embodiment of the present disclosure.

FIG. 1 is a flow chart illustrating a method for managing a desktop according to an embodiment of the present disclosure. As illustrated in FIG. 1, the method for managing a desktop includes following acts S101 to S104.

At block S101, a desktop management request sent by a mobile terminal is obtained by a server. The desktop management request carries user information and desktop application information.

In detail, the user information may include information provided by a user at register, such as gender information and/or age information and/or a mobile phone number, etc., and may also include a current position of the mobile terminal; the desktop application information may include application names corresponding to all applications on a current screen of the mobile terminal.

The mobile terminal may be a single-screen smart phone, a double-screen smart phone or a tablet, etc.

The current screen may be a single screen or include two independent screens, but no matter for a single screen or double screens, the application names corresponding to icons of the applications displayed on the current screen may be extracted and the extracted application names are used as the desktop application information. Besides, the current position of the mobile terminal may be used as the user information. The extracted user information and desktop application information are added to the desktop management request. The desktop management request carrying the user information and the desktop application information is uploaded to the server.

In detail, the user information may include user region information, user gender information and user identification code.

The desktop application information may include an application name corresponding to each of at least one application displayed on the current screen.

At block 102, a management rule corresponding to the desktop management request is selected from a preset rule base by the server.

In detail, the server may select the management rule corresponding to the desktop management request from the preset rule base, and the preset rule base may include a plurality of management rules. In detail, the plurality of management rules may include a region management rule, a gender management rule, a quantity management rule, and etc. Besides, each management rule may correspond to one preset rule number.

Alternatively, the server may obtain a user identification code in the mobile terminal, which may be referred as a phone number identifier (i.e. a mobile phone number). When the phone number identifier is obtained, the user region information and the user gender information in the user information are neglected. That is, a preset rule number corresponding to the phone number identifier is searched from the rule base only according to a tail number of the phone number, and a management rule corresponding to the preset rule number is obtained accordingly. For example, a mobile terminal with a mobile phone tail number 1-3 is allocated with a region management rule with a rule number 1, a mobile terminal with a mobile phone tail number 4-6 is allocated with a gender management rule with a rule number 2, and a mobile terminal with a mobile phone tail number 7-0 is allocated with a quantity management rule with a rule number 3.

At block S103, user interest feature information corresponding to the user information is analyzed according to the management rule, and the desktop application information is planned according to the user interest feature information to generate desktop application arrangement information.

In detail, when the management rule is the region management rule, user region information may be further extracted from the user information, and preset region information same with the user region information is searched from the region management rule as target preset region information. Then preset interest feature information corresponding to the target preset region information is obtained from the region management rule as the user interest feature information corresponding to the user information. Alternatively, when the management rule is the gender management rule, user gender information may be further extracted from the user information, and preset gender information same with the user gender information is searched from the gender management rule as target preset gender information. Then preset interest feature information corresponding to the target preset gender information is obtained from the gender management rule as the user interest feature information corresponding to the user information. Alternatively, when the management rule is the quantity management rule, application types corresponding to various application names in the desktop application information is further determined, then numbers of applications corresponding to at least one of the application types related to the desktop application information are counted, and an application type corresponding to a greatest number of applications is considered as a target application type. After that, a preset application type same with the target application type is searched from the quantity management rule as a target preset application type, and preset interest feature information corresponding to the target preset application type is obtained from the quantity management rule as the user interest feature information corresponding to the user information. After that, the server may further plan the desktop application information according to the user interest feature information to generate the desktop application arrangement information.

In detail, each management rule in the preset rule base may correspond to a different desktop icon arrangement pattern so as to enrich desktop icon display effect. Besides, each of the plurality of management rules may correspond to one preset rule number, so that the corresponding management rule may be selected for the user according to the preset rule number and the user identification code (for example, a mobile phone number).

In an embodiment, the region management rule includes a plurality pieces of preset interest feature information corresponding to a plurality pieces of preset region information.

In an embodiment, the gender management rule includes two pieces of preset interest feature information corresponding to two pieces of preset gender information.

In an embodiment, the quantity management rule includes a plurality pieces of preset interest feature information corresponding to a plurality of application types.

In detail, the interest feature information of the user may be an application type which is preferred by the user. For example, when the interest feature information of the user includes game and chat, it means that the application type preferred by the user may include a game type and an instant messaging type.

At block S104, the desktop application arrangement information is sent to the mobile terminal, such that the mobile terminal arranges a plurality of application icons on the desktop according to the desktop application arrangement information.

In detail, the server may send the desktop application arrangement information to the mobile terminal, such that the mobile terminal can load the application icons on an installed third-party desktop according to the desktop application arrangement information and make an overall arrangement of the loaded application icons according to the desktop icon arrangement pattern in the desktop application arrangement information.

For example, after the desktop application information is planned, there are three application interfaces (a first screen application interface, a second screen application interface, and a third screen application interface) in the desktop application arrangement information, and each application interface carries different application icons. For another example, taking the gender management rule as an example, when the user of the mobile terminal is male, the user interest feature information may include application types of game feature and instant messaging feature, and the instant messaging feature has a higher priority than the game feature. The desktop application arrangement information generated by the mobile terminal according to the user interest feature information may include: 2 game application icons used most frequently in a main page of the desktop; 3 instant messaging application icons used frequently in a second page of the desktop; and 5 shopping application icons used less frequently in a third page of the desktop. Thus, when the mobile terminal receives the desktop application arrangement information corresponding to the 10 application icons, the mobile terminal loads each application icon to the corresponding desktop to arrange each application icon according the desktop application arrangement information.

For another example, still taking the above 10 application icons (2 game application icons, 3 instant messaging application icons and 5 shopping application icons) as an example, when the first screen application interface can contain 10 application icons, the mobile terminal may place all the 10 application icons in the first screen application interface according to the user interest feature information. Further, the 2 game application icons used most frequently in the 10 application icons are placed at a first and a second icon position; the 3 instant messaging application icons used frequently are placed in turn at a third, a fourth and a five icon position; and the 5 remaining shopping application icons used less frequently are placed in turn at a sixth to tenth icon position. Alternatively, when the first screen application interface can only contain 5 application icons, the 2 game application icons used most frequently are placed at the first and the second icon position of the first screen application interface; the 3 instant messaging application icons used frequently are placed in turn at the third, fourth and five icon position; and the 5 remaining shopping application icons used less frequently are placed in turn at icon positions of the second screen application interface.

Alternatively, the mobile terminal may also arrange the plurality of application icons based on priority information of the application icons on the desktop in the application arrangement information according to the received desktop application arrangement information.

It can be seen from above embodiments that, first, the desktop management request sent by the mobile terminal is obtained by the server, in which the desktop management request carries the user information and the desktop application information; then the management rule corresponding to the desktop management request is selected from the preset rule base by the server; after that, the user interest feature information corresponding to the user information is analyzed according to the management rule, and the desktop application information is planned according to the user interest feature information to generate the desktop application arrangement information; at last, the desktop application arrangement information is sent to the mobile terminal, so that the mobile terminal arranges a plurality of application icons on the desktop according to the desktop application arrangement information. With the present disclosure, by selecting the management rule corresponding to the desktop management request from the preset rule base to enrich desktop icon arrangement patterns via different management rules, and by analyzing the user interest feature corresponding to the user information according to the management rule and further planning the obtained desktop application information according to the user interest feature, the desktop application arrangement information which can satisfy the user interest feature may be generated. Therefore the mobile terminal may manage the layout of the application icons rapidly according to the desktop application arrangement information, thus enriching the desktop icon display effect and avoiding cumbersome manual layout operations.

Figure 2:
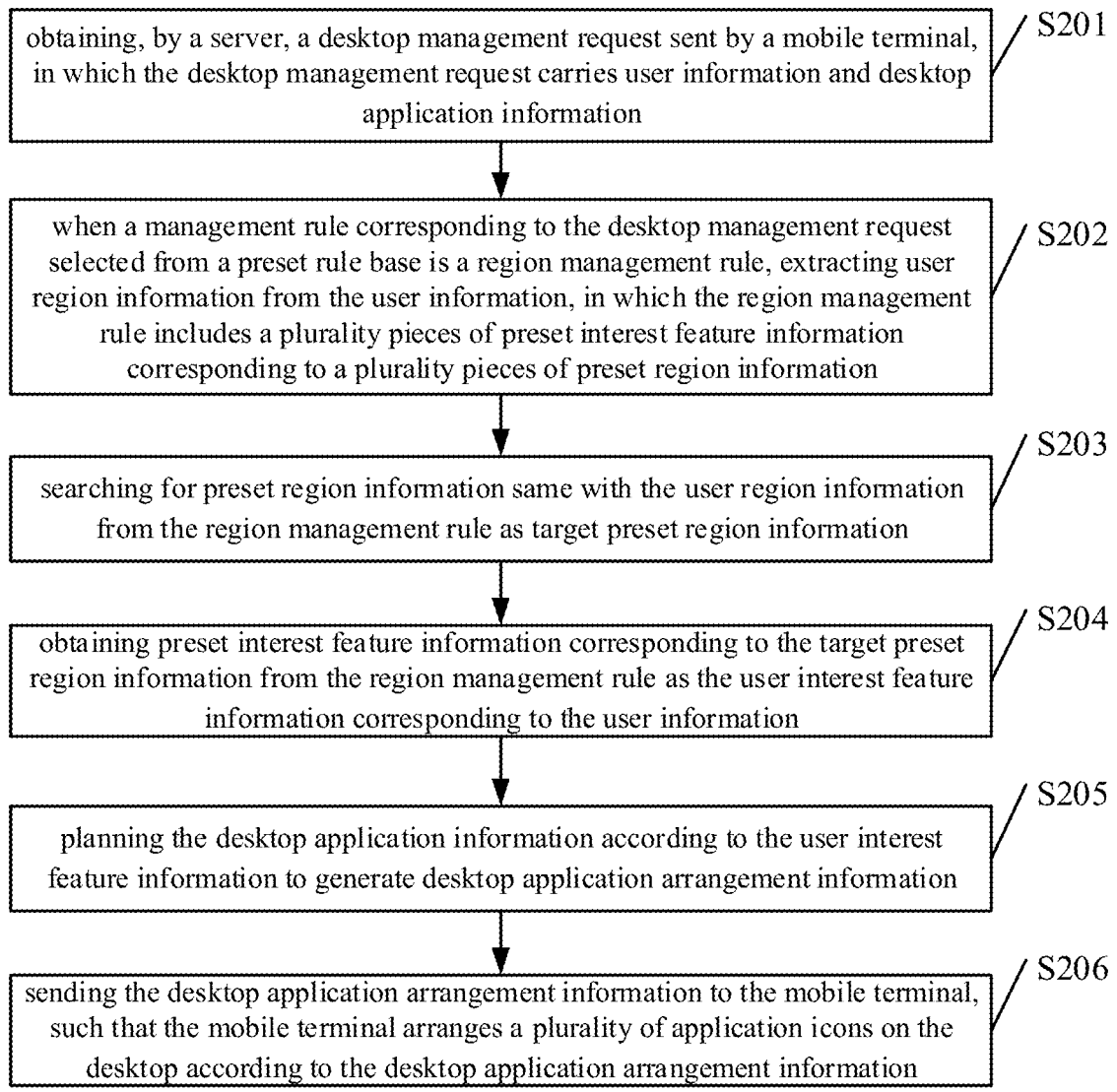
FIG. 2 is a flow chart illustrating a method for managing a desktop according to another embodiment of the present disclosure.

Further referring to FIG. 2, FIG. 2 is a flow chart illustrating a method for managing a desktop according to another embodiment of the present disclosure. As illustrated in FIG. 2, the method for managing a desktop includes at least following acts S201 to S206.

At block S201, a desktop management request sent by a mobile terminal is obtained by a server. The desktop management request carries user information and desktop application information.

Detail implementation of act S201 may be found in descriptions of act S101 in above embodiments with reference to FIG. 1, thus will not be elaborated here.

At block 202, when a management rule corresponding to the desktop management request selected from a preset rule base is a region management rule, user region information is extracted from the user information.

In an embodiment, the region management rule includes a plurality pieces of preset interest feature information corresponding to a plurality pieces of preset region information.

In detail, the user region information may be predicted by matching between frequently-used applications in the terminal and applications in the region management rule, or region information of where the user stands may be obtained by a location application and be taken as the user region information of the user information. Besides, the user region information may also be determined by a region sub-segment number corresponding to a SIM (subscriber identity module) card used in the mobile terminal.

For instance, taking a Chinese eleven-digit mobile phone number as an example, the first three digits can be used to distinguish the network identification number (that is, the network permission access status corresponding to one of the three operators in China can be determined accordingly). In addition, the 4th to 7th digits are configured to distinguish a region where the user belongs (for example, it can be determined from 1522311, 1522321 and 1522332 that the users who use these numbers belong to Chongqing region, thus Chongqing is used as the user region information of these users). The 8th to 11th digits are configured to distinguish different users. Therefore, the sub-segment number from the 4th to 7th digits may be used to determine the user region information of each user.

At block S203, preset region information same with the user region information is searched from the region management rule as target preset region information.

At block S204, preset interest feature information corresponding to the target preset region information is obtained from the region management rule as the user interest feature information corresponding to the user information.

In detail, the preset interest feature information of the user may be an application type which is preferred by the user. For example, when the user region information is China, the preset interest feature information of the user may be an instant messaging application such as Wechat, while when the user region information is America, the preset interest feature information of the user may be an instant messaging application such as WhatsApp.

At block S205, the desktop application information is planned according to the user interest feature information to generate desktop application arrangement information.

At block S206, the desktop application arrangement information is sent to the mobile terminal, such that the mobile terminal arranges a plurality of application icons on the desktop according to the desktop application arrangement information.

For example, user A prefers instant messaging applications such as QQ and Wechat, etc. while user B prefers instant messaging applications such as WhatsApp and the like. The server may search for preset region information matching the applications preferred by user A and user B according to desktop application information uploaded by the two users respectively (For example, Chinese users generally use instant messaging applications such as QQ and Wechat, while American users generally use instant messaging applications such as WhatsApp). Then it may be determined that the user region information (nationality) corresponding to user A is China and the user region information (nationality) corresponding to user B is America. Thereafter, the interest feature information corresponding to the user information of the two users is obtained from the region management rule according to the user region information of the two users. For example, instant messaging applications preferred by user A, such as QQ and Wechat, etc., are placed on a first screen of a mobile terminal used by user A, and instant messaging applications preferred by user B, such as WhatsApp and the like, are placed on a first screen of a mobile terminal used by user B. Thus by this way, the desktop application information may be planned according to the user interest feature information and the user is relieved from cumbersome manual operations for arranging the application icons.

Alternatively, when the user region information cannot be determined from the user information, i.e. when the user region information cannot be extracted (e.g. GPS signal is not open), a mobile phone number used by the mobile terminal may be further obtained, and a region where the mobile terminal belongs may be identified by the mobile phone number. Then the identified region is used as the user region information and above acts S204-S206 are performed accordingly.

It can be seen from above embodiments that, first, the desktop management request sent by the mobile terminal is obtained by the server, in which the desktop management request carries the user information and the desktop application information; then the management rule corresponding to the desktop management request is selected from the preset rule base by the server; after that, the user interest feature information corresponding to the user information is analyzed according to the management rule, and the desktop application information is planned according to the user interest feature information to generate the desktop application arrangement information; at last, the desktop application arrangement information is sent to the mobile terminal, so that the mobile terminal arranges a plurality of application icons on the desktop according to the desktop application arrangement information. With the present disclosure, by selecting the management rule corresponding to the desktop management request from the preset rule base to enrich desktop icon arrangement patterns via different management rules, and by analyzing the user interest feature corresponding to the user information according to the management rule and further planning the obtained desktop application information according to the user interest feature, the desktop application arrangement information which can satisfy the user interest feature may be generated. Therefore the mobile terminal may manage the layout of the application icons rapidly according to the desktop application arrangement information, thus enriching the desktop icon display effect and avoiding cumbersome manual layout operations.

Figure 3:
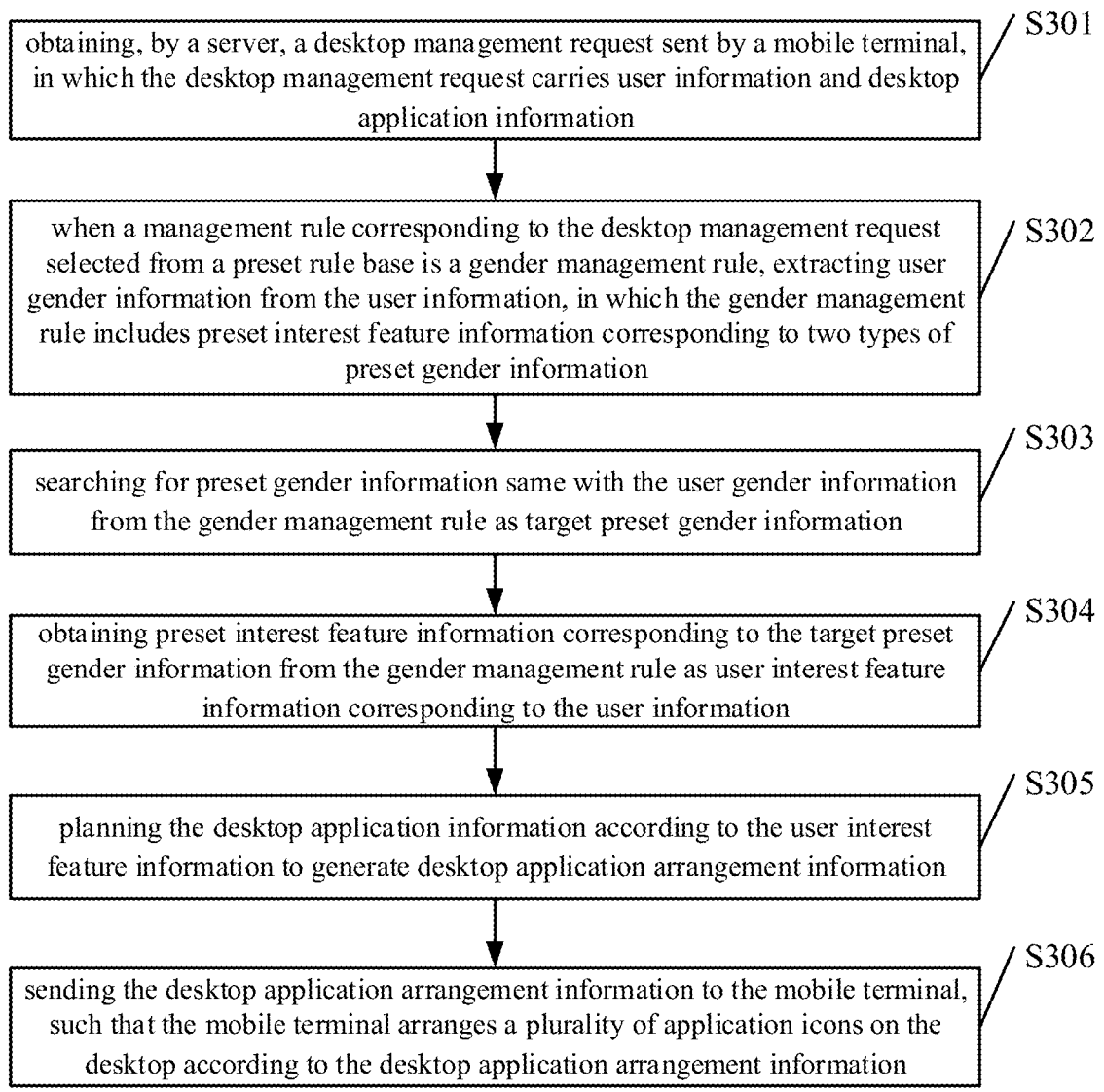
FIG. 3 is a flow chart illustrating a method for managing a desktop according to yet another embodiment of the present disclosure.

Further referring to FIG. 3, FIG. 3 is a flow chart illustrating a method for managing a desktop according to yet another embodiment of the present disclosure. As illustrated in FIG. 3, the method for managing a desktop includes at least following acts S301 to S306.

At block S301, a desktop management request sent by a mobile terminal is obtained by a server. The desktop management request carries user information and desktop application information.

Detail implementation of act S301 may be found in descriptions of act S101 in above embodiment s with reference to FIG. 1, thus will not be elaborated here.

At block 302, when a management rule corresponding to the desktop management request selected from a preset rule base is a gender management rule, user gender information is extracted from the user information. The gender management rule includes preset interest feature information corresponding to two types of preset gender information.

In detail, when the management rule corresponding to the desktop management request selected from the preset rule base is the gender management rule, whether the user gender information is included in the user information is further detected. If the gender information is included, the user gender information in the user information is extracted; if the gender information is not included, application name lists corresponding respectively to the two types of gender information are obtained and an application name list to which each application name in the desktop application information belongs is determined. The user gender information corresponding to the user information is then predicted according to the application name list to which each application name belongs.

In an embodiment, obtaining the user gender information include: obtaining information about the user on gender, age and like from register information of the user when the third-party desktop application program is installed. Alternatively, obtaining the user gender information may include: predicting the user gender information corresponding to the user information according to the application name list to which each application name in the desktop application information belongs.

For instance, assuming that the user gender information is not detected by the server and the received desktop application information includes 5 applications, which are application A, B, C, D and E. Here, the server obtains the application name lists corresponding respectively to the two preset types of gender information (male and female), in which an application name list corresponding to male is a first list, and an application name list corresponding to female is a second list. Then an application name list to which each of the five applications included in the desktop application information belongs is determined from the gender management rule. For example, when an application name list corresponding to the application A, B and C is the first list and an application name list corresponding to the application D and E is the second list, then it may be counted that there are 3 application names in the first list and 2 application names in the second list. Therefore the number of application names corresponding to the first list is greater than the number of application names corresponding to the second list, and the server may predict that the gender information corresponding to the user information is male. Then preset interest feature information corresponding to the male gender information is obtained. For example, game applications may be relatively more in the desktop application information.

In detail, in the gender management rule, the preset interest feature information of the user may be an application type which is preferred by a specific gender of user. For example, if the user gender information is male, the preset interest feature information includes types of applications with game feature, instant messaging feature, and the like; if the user gender information is female, the preset interest feature information includes types of applications with beauty feature, auto heterodyne feature, and the like.

Alternatively, when the number of application names corresponding to the first list is less than the number of application names corresponding to the second list, the server may predict that the gender information corresponding to the user information is female. Then preset interest feature information corresponding to the female gender information is obtained. For example, beauty applications may be relatively more in the desktop application information.

At block S303, preset gender information same with the user gender information is searched from the gender management rule as target preset gender information.

At block S304, preset interest feature information corresponding to the target preset gender information is obtained from the gender management rule as user interest feature information corresponding to the user information.

At block S305, the desktop application information is planned according to the user interest feature information to generate desktop application arrangement information.

At block S306, the desktop application arrangement information is sent to the mobile terminal, such that that the mobile terminal arranges a plurality of application icons on the desktop according to the desktop application arrangement information.

In detail, the server may send the desktop application arrangement information to the mobile terminal, such that the mobile terminal can load the application icons on an installed third-party desktop according to the desktop application arrangement information and make an overall arrangement of the loaded application icons according to a desktop icon arrangement pattern in the desktop application arrangement information.

It can be seen from above embodiments that, first, the desktop management request sent by the mobile terminal is obtained by the server, in which the desktop management request carries the user information and the desktop application information; then the management rule corresponding to the desktop management request is selected from the preset rule base by the server; after that, the user interest feature information corresponding to the user information is analyzed according to the management rule, and the desktop application information is planned according to the user interest feature information to generate the desktop application arrangement information; at last, the desktop application arrangement information is sent to the mobile terminal, so that the mobile terminal arranges a plurality of application icons on the desktop according to the desktop application arrangement information. With the present disclosure, by selecting the management rule corresponding to the desktop management request from the preset rule base to enrich desktop icon arrangement patterns via different management rules, and by analyzing the user interest feature corresponding to the user information according to the management rule and further planning the obtained desktop application information according to the user interest feature, the desktop application arrangement information which can satisfy the user interest feature may be generated. Therefore the mobile terminal may manage the layout of the application icons rapidly according to the desktop application arrangement information, thus enriching the desktop icon display effect and avoiding cumbersome manual layout operations.

Figure 4:
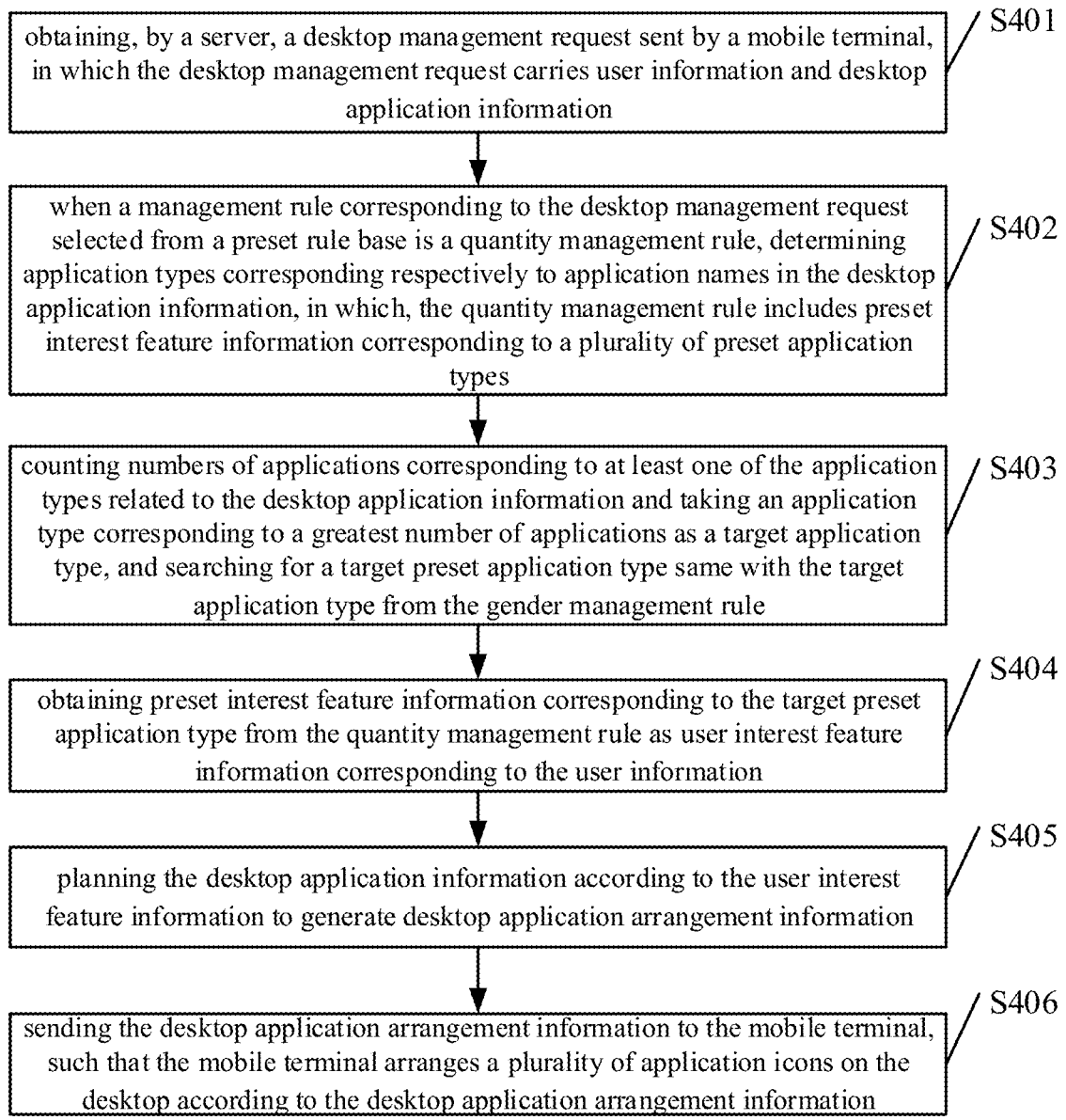
FIG. 4 is a flow chart illustrating a method for managing a desktop according to still another embodiment of the present disclosure.

Further referring to FIG. 4, FIG. 4 is a flow chart illustrating a method for managing a desktop according to still another embodiment of the present disclosure. As illustrated in FIG. 4, the method for managing a desktop includes at least following acts S401 to S406.

At block S401, a desktop management request sent by a mobile terminal is obtained by a server. The desktop management request carries user information and desktop application information.

Detail implementation of act S401 may be found in descriptions of act S101 in above embodiments illustrated with reference to FIG. 1, thus will not be elaborated here.

At block S402, when a management rule corresponding to the desktop management request selected from a preset rule base is a quantity management rule, application types corresponding respectively to application names in the desktop application information are determined. The quantity management rule includes preset interest feature information corresponding to a plurality of preset application types.

In an embodiment, when the management rule corresponding to the desktop management request selected from the preset rule base is the quantity management rule, the server may further classify a plurality of application names in the desktop application information to determine the application types corresponding to the application names. For example, the application types may include a game application type, a beauty application type, a photograph application type, an instant messaging type, etc.

At block S403, numbers of applications corresponding to at least one of the application types related to the desktop application information are counted, and an application type corresponding to a greatest number of applications is considered as a target application type, and a target preset application type same with the target application type is searched for from the gender management rule.

At block S404, preset interest feature information corresponding to the target preset application type is obtained from the quantity management rule as user interest feature information corresponding to the user information.

In detail, when the target preset application type is the game type, the corresponding preset interest feature information may be game feature (i.e. game applications may be prior placed in the first screen of the desktop afterwards); when the target preset application type is the instant messaging type, the corresponding preset interest feature information may be instant messaging feature (i.e. instant messaging applications may be prior placed in the first screen of the desktop afterwards).

At block S405, the desktop application information is planned according to the user interest feature information to generate desktop application arrangement information.

At block S406, the desktop application arrangement information is sent to the mobile terminal, such that the mobile terminal arranges a plurality of application icons on the desktop according to the desktop application arrangement information.

In detail, the server may send the desktop application arrangement information to the mobile terminal, such that the mobile terminal can load the application icons on an installed third-party desktop according to the desktop application arrangement information and make an overall arrangement of the loaded application icons according to a desktop icon arrangement pattern in the desktop application arrangement information.

For instance, taking the desktop application information including 10 application names as an example, the server may further classified the 10 application names into different application types to determine the application type corresponding to each application name Assuming it is counted that 5 of the 10 application names belong to a game application type, 3 application names belong to a navigation application type, 2 application names belong to a photograph application type, then preset interest feature information corresponding to the game application type may be considered as the user interest feature information. Further, icons corresponding to the 10 application names are arranged according to the user interest feature information, for example, icons corresponding to the 5 application names belong to the game application type are placed in a first screen page of the third-party desktop application program, while icons corresponding to other application names are placed in a second screen page.

It can be seen from above embodiments that, first, the desktop management request sent by the mobile terminal is obtained by the server, in which the desktop management request carries the user information and the desktop application information; then the management rule corresponding to the desktop management request is selected from the preset rule base by the server; after that the user interest feature information corresponding to the user information is analyzed according to the management rule, and the desktop application information is planned according to the user interest feature information to generate the desktop application arrangement information; at last, the desktop application arrangement information is sent to the mobile terminal, so that the mobile terminal arranges a plurality of application icons on the desktop according to the desktop application arrangement information. With the present disclosure, by selecting the management rule corresponding to the desktop management request from the preset rule base to enrich desktop icon arrangement patterns via different management rules, and by analyzing the user interest feature corresponding to the user information according to the management rule and further planning the obtained desktop application information according to the user interest feature, desktop application arrangement information which can satisfy the user interest feature may be generated, therefore the mobile terminal may manage layout of the application icons rapidly according to the desktop application arrangement information, thus enriching the desktop icon display effect and avoiding cumbersome manual layout operations.

Figure 5:
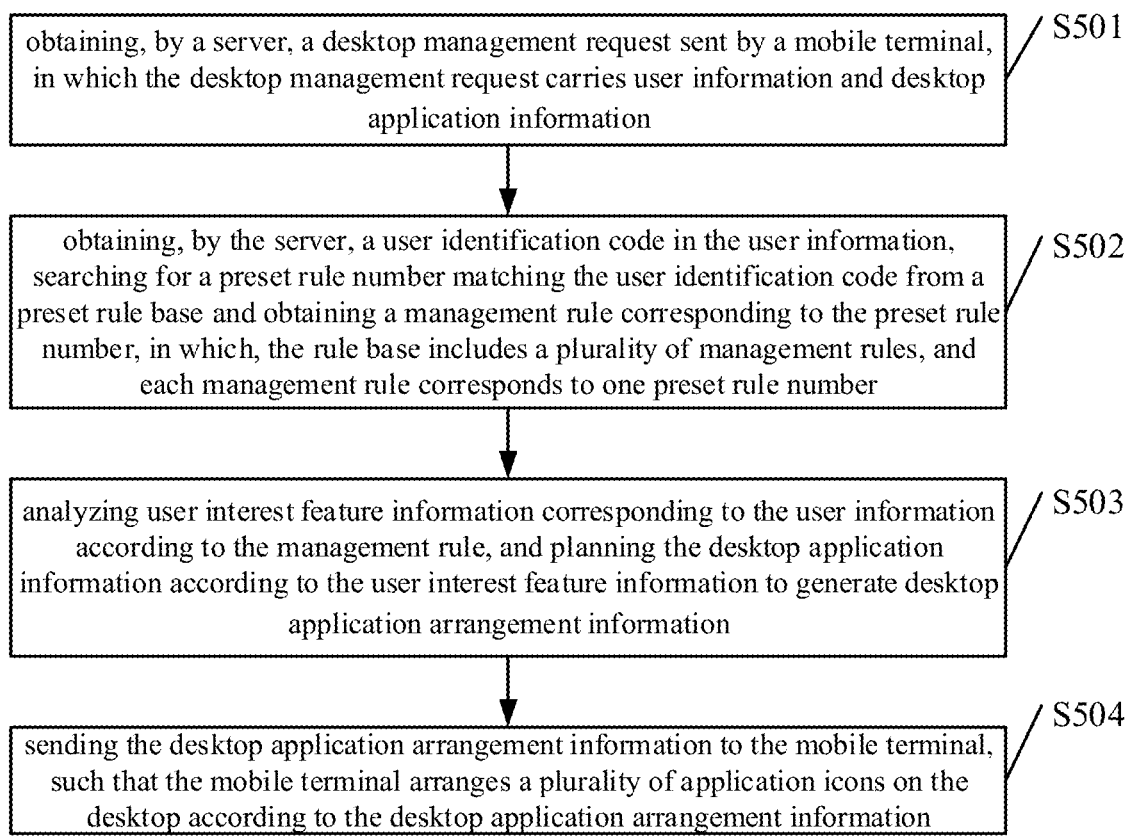
FIG. 5 is a flow chart illustrating a method for managing a desktop according to still yet another embodiment of the present disclosure.

Further referring to FIG. 5, FIG. 5 is a flow chart illustrating a method for managing a desktop according to still yet another embodiment of the present disclosure. As illustrated in FIG. 5, the method for managing a desktop includes at least following acts S501 to S504.

At block S501, a desktop management request sent by a mobile terminal is obtained by a server. The desktop management request carries user information and desktop application information.

Detail implementation of act S501 may be found in descriptions of act S101 in above embodiments illustrated with reference to FIG. 1, thus will not be elaborated here.

At block S502, a user identification code in the user information is obtained by the server, a preset rule number matching the user identification code is searched from a preset rule base by the server, and a management rule corresponding to the preset rule number is obtained by the server.

In detail, the rule base may include a plurality of management rules and each management rule corresponds to one preset rule number.

For example, management rule A corresponds to a preset rule number 1, management rule B corresponds to a preset rule number 2, and the user identification code is a mobile phone number of the user. When a tail number of the mobile phone number of the user is an odd number, the management rule A with the preset rule number 1 is allocated to the mobile terminal using the mobile phone number of the user; when a tail number of the mobile phone number of the user is an even number, the management rule B with the preset rule number 2 is allocated to the mobile terminal using the mobile phone number of the user. Therefore each of the management rules in the rule base may be distributed evenly to massive mobile terminals, so that which management rule is more popular may be easy to find out in subsequent statistics. In an embodiment, the management rule A may be the region management rule in embodiments illustrated with reference to FIG. 2, the management rule B may be the gender management rule in embodiments illustrated with reference to FIG. 3, thus by evenly distributing these two management rules, which one of the region management rule and the gender management rule is more likely to be accepted by users can be found out in subsequent statistics At block S503, user interest feature information corresponding to the user information is analyzed according to the management rule, and the desktop application information is planned according to the user interest feature information to generate desktop application arrangement information.

In detail, in act S502, when the management rule selected according to the preset rule number corresponding to the user identification code in the user information is the region management rule, user region information may be further extracted from the user information, and preset region information same with the user region information is searched from the region management rule as target preset region information. Then preset interest feature information corresponding to the target preset region information is obtained as the user interest feature information corresponding to the user information. After that, the desktop application information is planned according to the user interest feature information to generate the desktop application arrangement information. Detail implementation of the region management rule may be found in descriptions of act S202-S205 in above embodiments illustrated with reference to FIG. 2, thus will not be elaborated here.

Alternatively, in act S502, when the management rule selected according to the preset rule number corresponding to the user identification code in the user information is the gender management rule, user gender information may be further extracted from the user information, and preset gender information same with the user gender information is searched from the gender management rule as target preset gender information. Then preset interest feature information corresponding to the target preset gender information is obtained as the user interest feature information corresponding to the user information. After that, the desktop application information is planned according to the user interest feature information to generate the desktop application arrangement information. Detail implementation of the gender management rule may be found in descriptions of act S302-S305 in above embodiments illustrated with reference to FIG. 3, thus will not be elaborated here.

Alternatively, in acts S502, when the management rule selected according to the preset rule number corresponding to the user identification code in the user information is the quantity management rule, application types corresponding to various application names in the desktop application information are further determined, then numbers of applications corresponding to at least one of the application types related to the desktop application information are counted, and an application type corresponding to a greatest number of applications is considered as a target application type. After that, a preset application type corresponding to the target application type is searched from the quantity management rule as a target preset application type, and preset interest feature information corresponding to the target preset application type is obtained from the quantity management rule as the user interest feature information corresponding to the user information. After that, the desktop application information is planned according to the user interest feature information to generate the desktop application arrangement information. Detail implementation of the quantity management rule may be found in descriptions of act S402-S405 in above embodiments illustrated with reference to FIG. 4, thus will not be elaborated here.

At block S504, the desktop application arrangement information is sent to the mobile terminal, such that the mobile terminal arranges a plurality of application icons on the desktop according to the desktop application arrangement information.

In detail, the server may send the desktop application arrangement information to the mobile terminal, such that the mobile terminal can load the application icons on an installed third-party desktop according to the desktop application arrangement information and make an overall arrangement of the loaded application icons according to a desktop icon arrangement pattern in the desktop application arrangement information.

It can be seen from above embodiments that, first, the desktop management request sent by the mobile terminal is obtained by the server, in which the desktop management request carries the user information and the desktop application information; then the management rule corresponding to the desktop management request is selected from the preset rule base by the server; after that, the user interest feature information corresponding to the user information is analyzed according to the management rule, and the desktop application information is planned according to the user interest feature information to generate the desktop application arrangement information; at last, the desktop application arrangement information is sent to the mobile terminal, so that the mobile terminal arranges a plurality of application icons on the desktop according to the desktop application arrangement information. With the present disclosure, by selecting the management rule corresponding to the desktop management request from the preset rule base to enrich desktop icon arrangement patterns via different management rules, and by analyzing the user interest feature corresponding to the user information according to the management rule and further planning the obtained desktop application information according to the user interest feature, the desktop application arrangement information which can satisfy the user interest feature may be generated. Therefore the mobile terminal may manage the layout of the application icons rapidly according to the desktop application arrangement information, thus enriching the desktop icon display effect and avoiding cumbersome manual layout operations.

Alternatively, the server may also receive desktop management application-uninstall information uploaded by the mobile terminal and count an application-uninstall quantity corresponding to each management rule in the rule base according to preset rule numbers of the management rules carried in the desktop management application-uninstall information. A management rule with a greatest application-uninstall quantity is considered as a first management rule and the first management rule may be deleted. While a management rule with a least application-uninstall quantity is considered as a second management rule and the second management rule may be reserved. Or a plurality of management rules may be combined together according to the application-uninstall quantities corresponding to the management rules to obtain a combined management rule.

In an embodiment, when the server distributes the management rules in the rule base to a plurality of users according to their user identification codes, the server may receive desktop management application-uninstall information uploaded by a plurality of mobile terminals and count an application-uninstall quantity corresponding respectively to the region management rule, the gender management rule and the quantity management rule according to preset rule numbers of the management rules carried in the desktop management application-uninstall information. Then a management rule with a greatest application-uninstall quantity among the application-uninstall quantities corresponding to above management rules is taken as a first management rule and the first management rule is deleted. Alternatively, the server may further take a management rule with a least application-uninstall quantity as a second management rule and reserve the second management rule. Alternatively, the server may further combine the region management rule, the gender management rule and the quantity management rule according to the application-uninstall quantities corresponding to these management rules to obtain a combined management rule.

For example, there are 3 types of users, A type user, B type user, and C type user, in which, the A type user has a mobile phone number (i.e. identification code of the user) with a tail number 1, 2 or 3; the B type user has a mobile phone number with a tail number 4, 5 or 6, the C type user has a mobile phone number with a tail number 7, 8 or 9. In an embodiment, in the rule base, the region management rule corresponds to a preset rule number 1, the gender management rule corresponds to a preset rule number 2, and the quantity management rule corresponds to a preset rule number 3. The preset rule number 1 is related to identification code 1/2/3, the preset rule number 2 is related to identification code 4/5/6, and the preset rule number 3 is related to identification code 7/8/9. Therefore, desktop application arrangement information corresponding to the region management rule with rule number 1 is sent to the A type user, desktop application arrangement information corresponding to the gender management rule with rule number 2 is sent to the B type user, and the desktop application arrangement information corresponding to the quantity management rule with rule number 3 is sent to the C type user. Besides, desktop application arrangement information corresponding to a random selection of the management rules may be sent to a user has a mobile phone number with a tail number 0. Thus, quantities of user group corresponding to the three management rules are similar. For instance there are 10 thousand of A type users who receive desktop application arrangement information corresponding to the region management rule, 10 thousand of B type users who receive desktop application arrangement information corresponding to the gender management rule, and 10 thousand of C type users who receive desktop application arrangement information corresponding to the quantity management rule. Then uninstall situation of each management rule among these 3 types of users may be counted. In detail, statistics of desktop management application-uninstall information may be achieved by counting uninstall situation of desktop management applications (i.e. third-party mobile phone desktops) carrying different management rules. For example, by statistics, the server counts 3 thousand of A type users who have uninstalled the application, i.e. there are still 7 thousand users chose to reserve the region management rule with the rule number 1; besides, the server also counts 2 thousand of B type users who have uninstalled the application, i.e. there are still 8 thousand users chose to reserve the gender management rule with the rule number 2; at mean time, the server further counts 5 thousand of C type users who have uninstalled the application, i.e. there are still 5 thousand users chose to reserve the quantity management rule with the rule number 3. It can be seen from above statistics that an application uninstall quantity of the region management rule is 3 thousand, an application uninstall quantity of the gender management rule is 2 thousand, and an application uninstall quantity of the quantity management rule is 5 thousand, i.e. the region management rule corresponds to a second greatest application uninstall quantity, the gender management rule corresponds to a least application uninstall quantity, and the quantity management rule corresponds to a greatest application uninstall quantity. Thus, the server may delete the quantity management rule, or only reserve the gender management rule, or further combine the three management rule to obtain a new management rule. Therefore, by observing service condition of the third-party desktop management application among the 30 thousand of users, it can be determined which one of the management rules with different rule numbers is most popular and which one is most unwanted, so that the management rules in the rule base may be updated and replaced. Moreover, when a management rule turns out to be the best according to further analysis, the management rule will be expanded to a wider range.

Alternatively, the server may only distribute a selected management rule to the mobile terminal, and then the terminal analyzes the user interest feature information corresponding to the user information according to the management rule, plans the desktop application information according to the user interest feature information, and generates the desktop application arrangement information in the mobile terminal. The process of generating the desktop application arrangement information in the mobile terminal is similar to the process of generating the desktop application arrangement information in the server, thus will not be elaborated.

Figure 6:
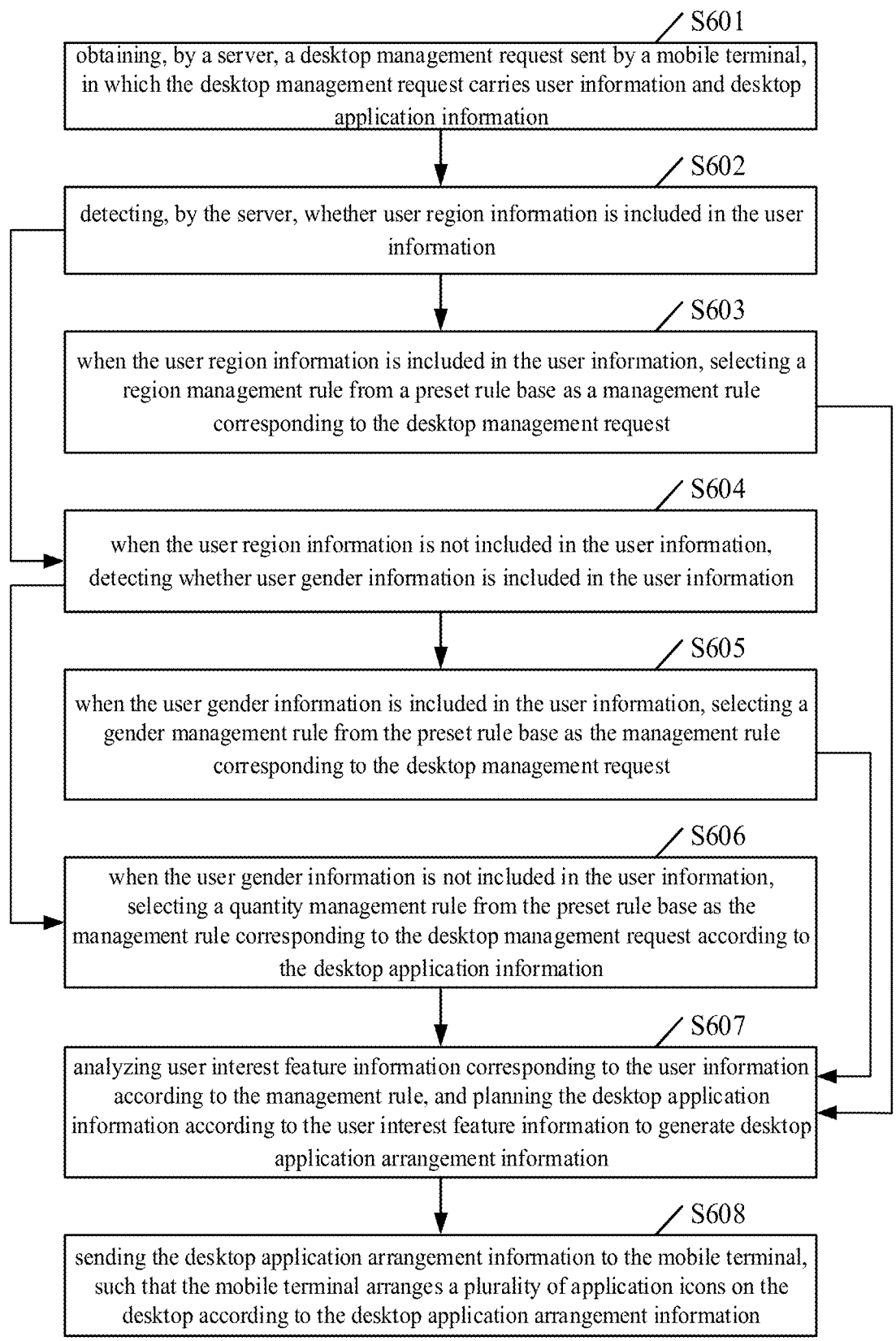
FIG. 6 is a flow chart illustrating a method for managing a desktop according to still yet another embodiment of the present disclosure.

Further referring to FIG. 6, FIG. 6 is a flow chart illustrating a method for managing a desktop according to still yet another embodiment of the present disclosure. As illustrated in FIG. 6, the method includes following acts S601-S607.

At block S601, a desktop management request sent by a mobile terminal is obtained by a server. The desktop management request carries user information and desktop application information.

At block S602, whether user region information is included in the user information is detected by the server.

At block S603, when the user region information is included in the user information, a region management rule is selected from a preset rule base as a management rule corresponding to the desktop management request.

At block S604, when the user region information is not included in the user information, whether user gender information is included in the user information is detected.

At block S605, when the user gender information is included in the user information, a gender management rule is selected from the preset rule base as the management rule corresponding to the desktop management request.

At block S606, when the user gender information is not included in the user information, a quantity management rule is selected from the preset rule base as the management rule corresponding to the desktop management request according to the desktop application information.

At block S607, user interest feature information corresponding to the user information is analyzed according to the management rule, and the desktop application information is planned according to the user interest feature information to generate desktop application arrangement information.

In detail, in act S602, when it is detected that the user region information is included in the user information, act S603 is performed, i.e. the region management rule is selected and preset region information same with the user region information is searched from the region management rule as target preset region information. Then preset interest feature information corresponding to the target preset region information is obtained as the user interest feature information corresponding to the user information. After that, the desktop application information is planned according to the user interest feature information to generate the desktop application arrangement information. Detail implementation of the region management rule may be found in descriptions of act S202-S205 in above embodiments illustrated with reference to FIG. 2, thus will not be elaborated here.

In detail, in act S602, when it is detected that the user region information is not included in the user information, act S604 is performed. If it is detected in act S604 that the user gender information is included in the user information, act S605 is further performed, i.e. the gender management rule is selected and preset gender information same with the user gender information is searched from the gender management rule as target preset gender information. Then preset interest feature information corresponding to the target preset gender information is obtained as the user interest feature information corresponding to the user information. After that, the desktop application information is planned according to the user interest feature information to generate the desktop application arrangement information. Detail implementation of the gender management rule may be found in descriptions of act S302-S305 in above embodiments illustrated with reference to FIG. 3, thus will not be elaborated here.

When in act S604, it is detected that the user gender information is not included in the user information, act S606 is further performed, i.e. the quantity management rule is selected, and application types corresponding to various application names in the desktop application information are further determined, then numbers of applications corresponding to at least one of the application types related to the desktop application information are counted, and an application type corresponding to a greatest number of applications is considered as a target application type. After that, a preset application type same with the target application type is searched from the quantity management rule as a target preset application type, and preset interest feature information corresponding to the target preset application type is obtained from the quantity management rule as the user interest feature information corresponding to the user information. After that, the desktop application information is planned according to the user interest feature information to generate the desktop application arrangement information. Detail implementation of the quantity management rule may be found in descriptions of act S402-S405 in above embodiments illustrated with reference to FIG. 4, thus will not be elaborated here.

At block S608, the desktop application arrangement information is sent to the mobile terminal, such that that the mobile terminal arranges a plurality of application icons on the desktop according to the desktop application arrangement information.

Detail implementation of act S608 may be found in descriptions of act S104 in above embodiments illustrated with reference to FIG. 1, thus will not be elaborated here.

It can be seen from above embodiments that, first, the desktop management request sent by the mobile terminal is obtained by the server, in which the desktop management request carries the user information and the desktop application information; then the management rule corresponding to the desktop management request is selected from the preset rule base by the server; after that the user interest feature information corresponding to the user information is analyzed according to the management rule, and the desktop application information is planned according to the user interest feature information to generate the desktop application arrangement information; at last, the desktop application arrangement information is sent to the mobile terminal, so that the mobile terminal arranges a plurality of application icons on the desktop according to the desktop application arrangement information. With the present disclosure, by selecting the management rule corresponding to the desktop management request from the preset rule base to enrich desktop icon arrangement patterns via different management rules, and by analyzing the user interest feature corresponding to the user information according to the management rule and further planning the obtained desktop application information according to the user interest feature, the desktop application arrangement information which can satisfy the user interest feature may be generated, therefore the mobile terminal may manage layout of the application icons rapidly according to the desktop application arrangement information, thus enriching the desktop icon display effect and avoiding cumbersome manual layout operations.

Figure 7:
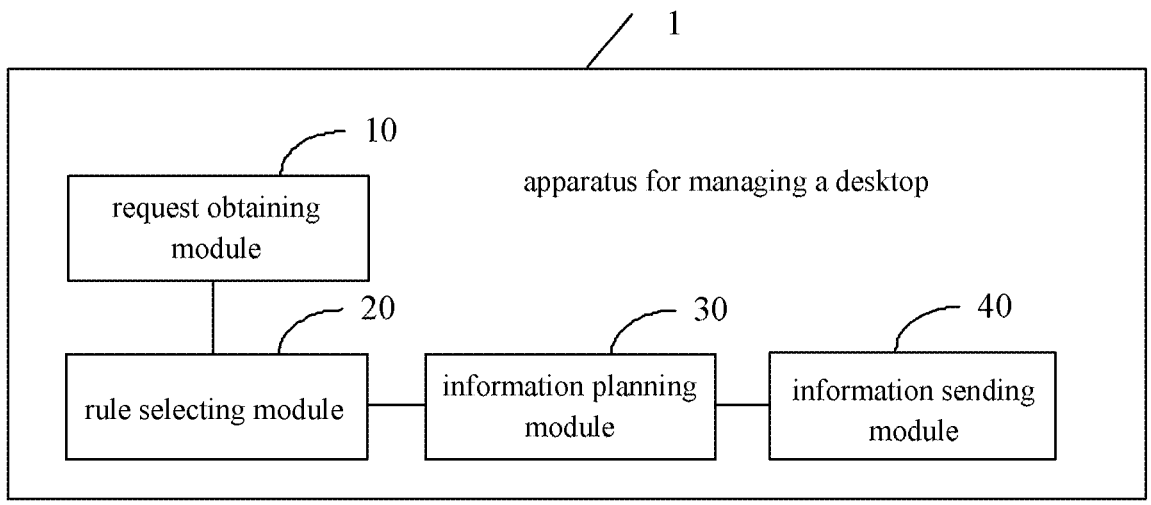
FIG. 7 is a block diagram of an apparatus for managing a desktop according to an embodiment of the present disclosure.

Further referring to FIG. 7, FIG. 7 is a block diagram of an apparatus for managing a desktop according to an embodiment of the present disclosure. As illustrated in FIG. 7, the apparatus 1 for managing a desktop may correspond to the server in embodiments described with reference to FIG. 1. The apparatus 1 for managing a desktop may include a request obtaining module 10, a rule selecting module 20, an information planning module 30, and an information sending module 40.

The request obtaining module 10 is configured to obtain a desktop management request sent by a mobile terminal. The desktop management request carries user information and desktop application information.

Detail implementation of the request obtaining module 10 may be found in descriptions of act S101 in above embodiments illustrated with reference to FIG. 1, thus will not be elaborated here.

The rule selecting module 20 is configured to select a management rule corresponding to the desktop management request from a preset rule base.

Detail implementation of the selecting module 20 may be found in descriptions of act S502 in above embodiments illustrated with reference to FIG. 5 or in descriptions of acts S601-605 in above embodiments illustrated with reference to FIG. 5, thus will not be elaborated here.

The information planning module 30 is configured to analyze user interest feature information corresponding to the user information according to the management rule, and to plan the desktop application information according to the user interest feature information to generate desktop application arrangement information.

Detail implementation of the information planning module 30 may be found in descriptions of act S103 in above embodiments illustrated with reference to FIG. 1, thus will not be elaborated here.

The information sending module 40 is configured to send the desktop application arrangement information to the mobile terminal, such that the mobile terminal arranges a plurality of application icons on the desktop according to the desktop application arrangement information.

Detail implementation of the information sending module 40 may be found in descriptions of act S104 in above embodiments illustrated with reference to FIG. 1, thus will not be elaborated here.

It can be seen from above embodiments that, first, the desktop management request sent by the mobile terminal is obtained by the apparatus for managing a desktop, in which the desktop management request carries the user information and the desktop application information; then the management rule corresponding to the desktop management request is selected from the preset rule base by the apparatus for managing a desktop; after that, the user interest feature information corresponding to the user information is analyzed according to the management rule, and the desktop application information is planned according to the user interest feature information to generate the desktop application arrangement information; at last, the desktop application arrangement information is sent to the mobile terminal, so that the mobile terminal arranges a plurality of application icons on the desktop according to the desktop application arrangement information. With the present disclosure, by selecting the management rule corresponding to the desktop management request from the preset rule base to enrich desktop icon arrangement patterns via different management rules, and by analyzing the user interest feature corresponding to the user information according to the management rule and further planning the obtained desktop application information according to the user interest feature, the desktop application arrangement information which can satisfy the user interest feature may be generated. Therefore the mobile terminal may manage the layout of the application icons rapidly according to the desktop application arrangement information, thus enriching the desktop icon display effect and avoiding cumbersome manual layout operations.

Figure 8:
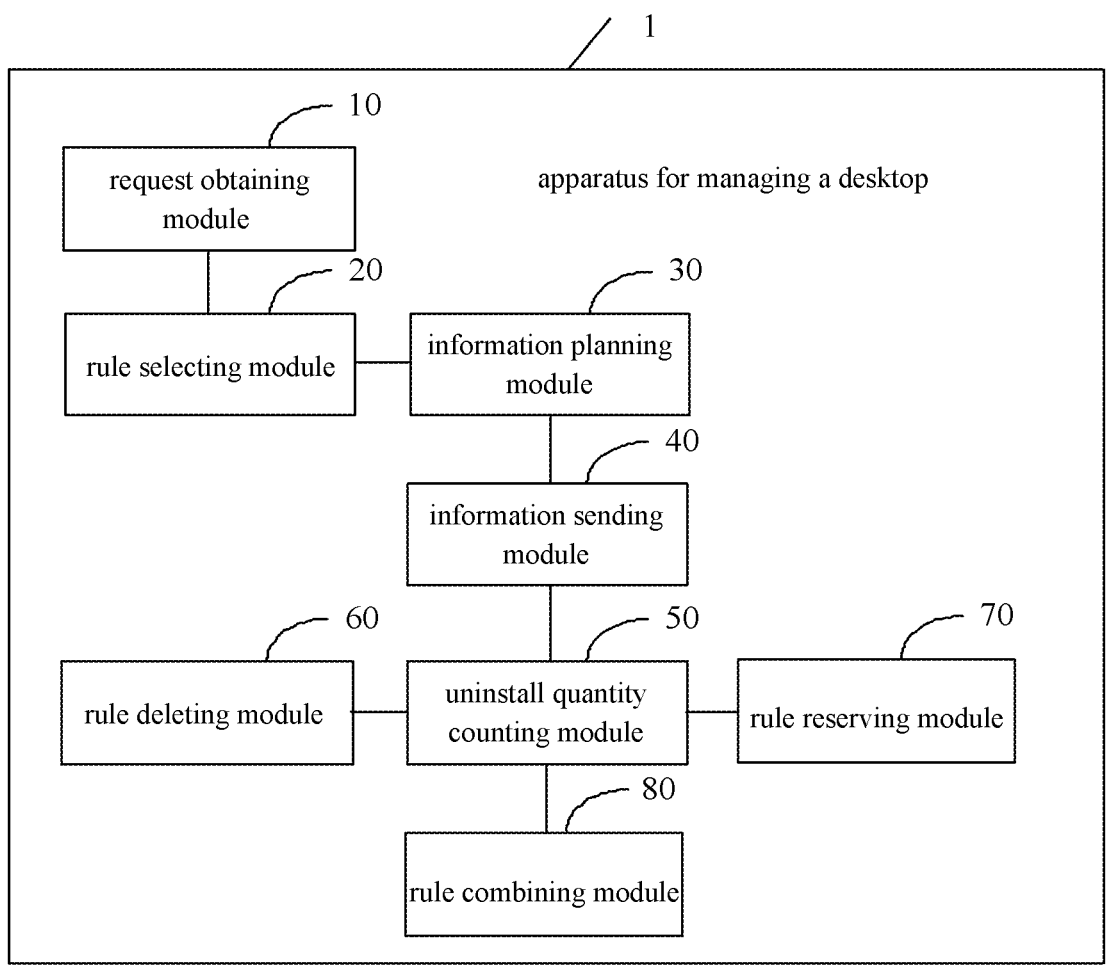
FIG. 8 is a block diagram of an apparatus for managing a desktop according to another embodiment of the present disclosure.

Further referring to FIG. 8, FIG. 8 is a block diagram of an apparatus for managing a desktop according to another embodiment of the present disclosure. As illustrated in FIG. 8, the apparatus 1 for managing a desktop may include the request obtaining module 10, the rule selecting module 20, the information planning module 30, and the information sending module 40 in embodiments described with reference to FIG. 7. The apparatus 1 for managing a desktop may further include a uninstall quantity counting module 50, a rule deleting module 60, a rule reserving module 70 and a rule combining module 80.

The uninstall quantity counting module 50 is configured to receive desktop management application-uninstall information uploaded by the mobile terminal and to count an application-uninstall quantity corresponding to each management rule in the rule base according to preset rule numbers of the management rules carried in the desktop management application-uninstall information.

The rule deleting module 60 is configured to take a management rule with a greatest application-uninstall quantity as a first management rule and to delete the first management rule.

The rule reserving module 70 is configured to take a management rule with a least application-uninstall quantity as a second management rule and to reserve the second management rule.

The rule combining module 80 is configured to combine a plurality of management rules together according to the application-uninstall quantities corresponding to the management rules to obtain a combined management rule.

Detail implementation of the uninstall quantity counting module 50, the rule deleting module 60, the rule reserving module 70 and the rule combining module 80 may be found in descriptions of application uninstall quantity corresponding to respective management rule in above embodiments illustrated with reference to FIG. 5, thus will not be elaborated here.

Figure 9:
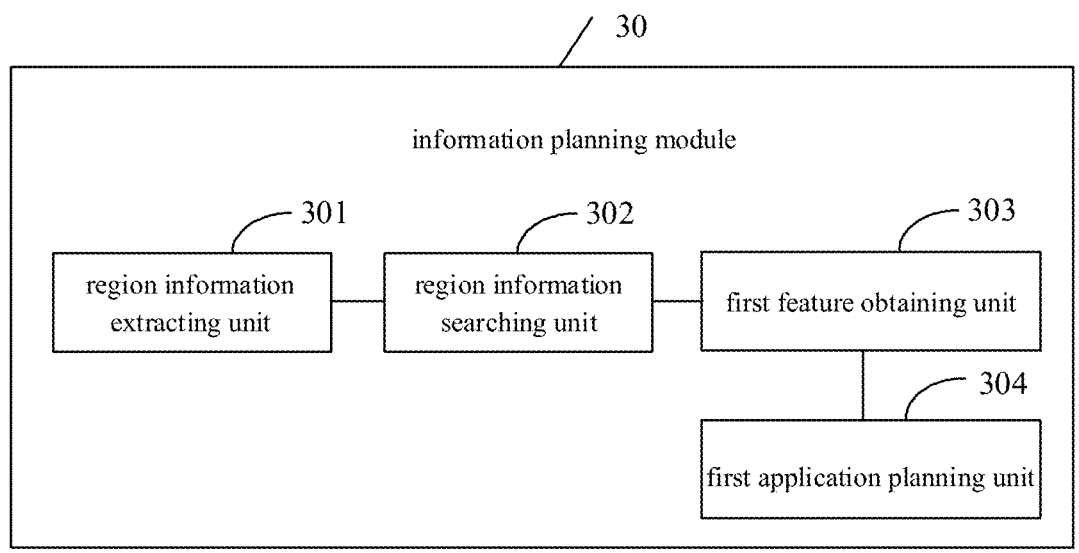
FIG. 9 is a block diagram of an information planning module according to an embodiment of the present disclosure.

Further referring to FIG. 9, FIG. 9 is a block diagram of an information planning module according to an embodiment of the present disclosure. As illustrated in FIG. 9, the information planning module 30 may include a region information extracting unit 301, a region information searching unit 302, a first feature obtaining unit 303, and a first application planning unit 304.

The region information extracting unit 301 is configured to extract user region information from the user information when the management rule is a region management rule. In an embodiment, the region management rule includes a plurality pieces of preset interest feature information corresponding to a plurality pieces of preset region information.

The region information searching unit 302 is configured to search for preset region information same with the user region information from the region management rule as target preset region information.

The first feature obtaining unit 303 is configured to obtain preset interest feature information corresponding to the target preset region information from the region management rule as the user interest feature information corresponding to the user information.

The first application planning unit 304 is configured to plan the desktop application information according to the user interest feature information to generate the desktop application arrangement information.

Detail implementation of the region information extracting unit 301, the region information searching unit 302, the first feature obtaining unit 303, and the first application planning unit 304 may be found in descriptions of acts S202-S205 in above embodiments illustrated with reference to FIG. 2, thus will not be elaborated here.

Figure 10:
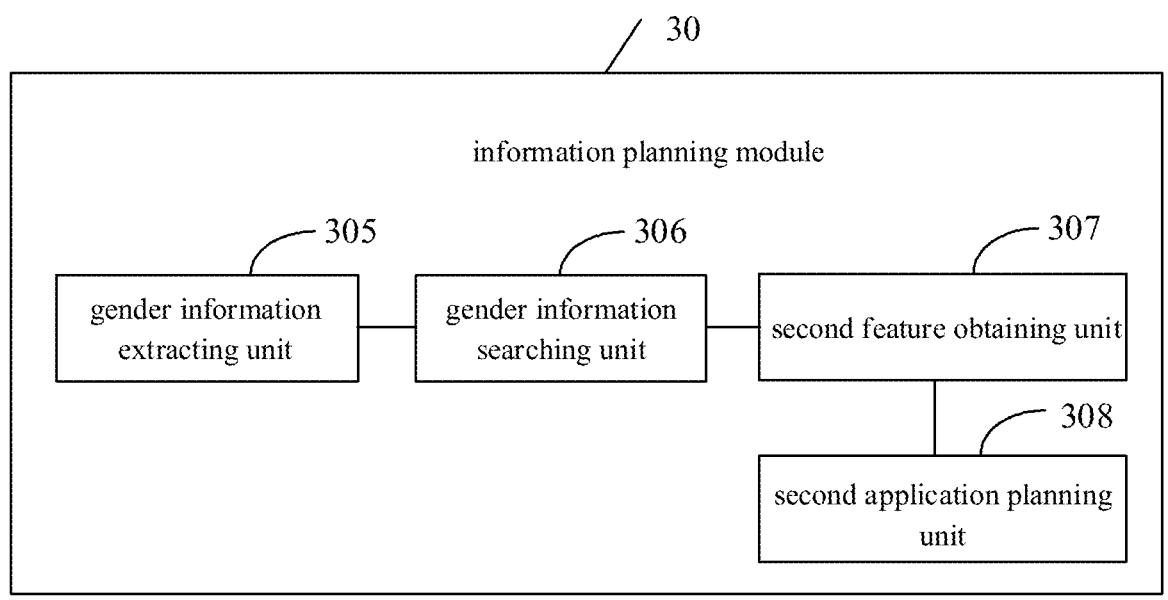
FIG. 10 is a block diagram of an information planning module according to another embodiment of the present disclosure.

Further referring to FIG. 10, FIG. 10 is a block diagram of an information planning module according to another embodiment of the present disclosure. As illustrated in FIG. 10, the information planning module 30 may include a gender information extracting unit 305, a gender information searching unit 306, a second feature obtaining unit 307, and a second application planning unit 308.

The gender information extracting unit 305 is configured to extract user gender information from the user information when the management rule is a gender management rule, in which the gender management rule includes preset interest feature information corresponding to two types of preset gender information.

Figure 11:
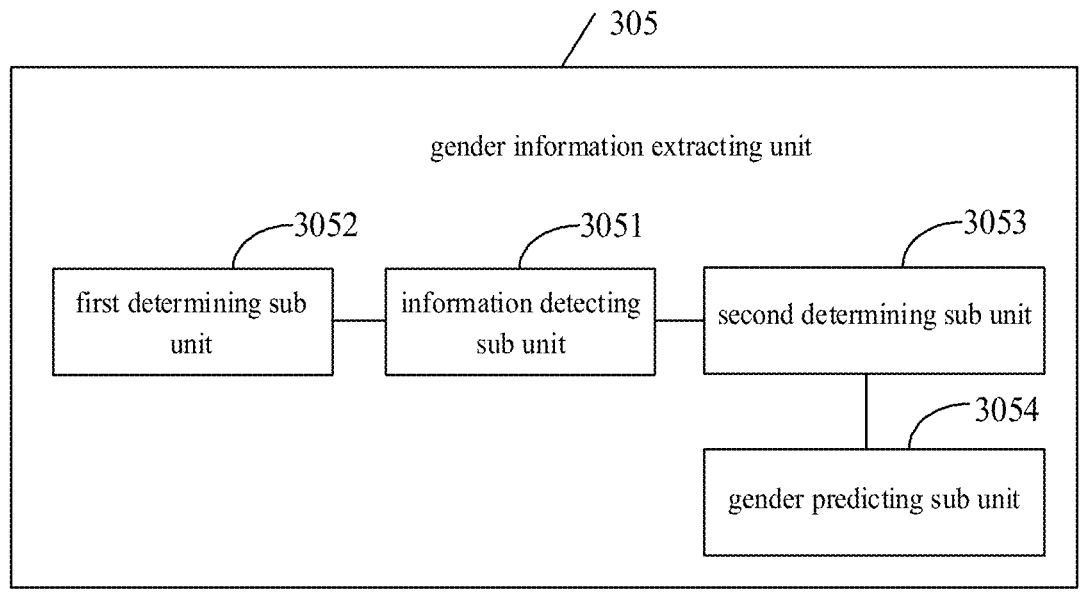
FIG. 11 is a block diagram of a gender information extracting unit according to an embodiment of the present disclosure.

Further referring to FIG. 11, FIG. 11 is a block diagram of a gender information extracting unit according to an embodiment of the present disclosure. As illustrated in FIG. 11, the gender information extracting unit 305 may include an information detecting sub unit 3051, a first determining sub unit 3052, a second determining sub unit 3053 and a gender predicting sub unit 3054.

The information detecting sub unit 3051 is configured to detect whether the user gender information is included in the user information when the management rule is the gender management rule.

The first determining sub unit 3052 is configured to extract the user gender information in the user information when the user gender information is included in the user information.

The second determining sub unit 3053 is configured to, when the user gender information is not included in the user information, obtain application name lists corresponding respectively to two preset gender information and to determine an application name list to which each application name in the desktop application information belongs.

The gender predicting sub unit 3054 is configured to predict the user gender information corresponding to the user information according to the application name list to which each application name in the desktop application information belongs.

Detail implementation of the information detecting sub unit 3051, the first determining sub unit 3052, the second determining sub unit 3053 and the gender predicting sub unit 3054 may be found in descriptions of act S302 in above embodiments illustrated with reference to FIG. 3, thus will not be elaborated here.

The gender information searching unit 306 is configured to search for preset gender information same with the user gender information from the gender management rule as target preset gender information.

The second feature obtaining unit 307 is configured to obtain preset interest feature information corresponding to the target preset gender information from the gender management rule as user interest feature information corresponding to the user information.

The second application planning unit 308 is configured to plan the desktop application information according to the user interest feature information to generate the desktop application arrangement information.

Detail implementation of the gender information extracting unit 305, the gender information searching unit 306, the second feature obtaining unit 307, and the second application planning unit 308 may be found in descriptions of acts S302-S305 in above embodiments illustrated with reference to FIG. 3, thus will not be elaborated here.

Figure 12:
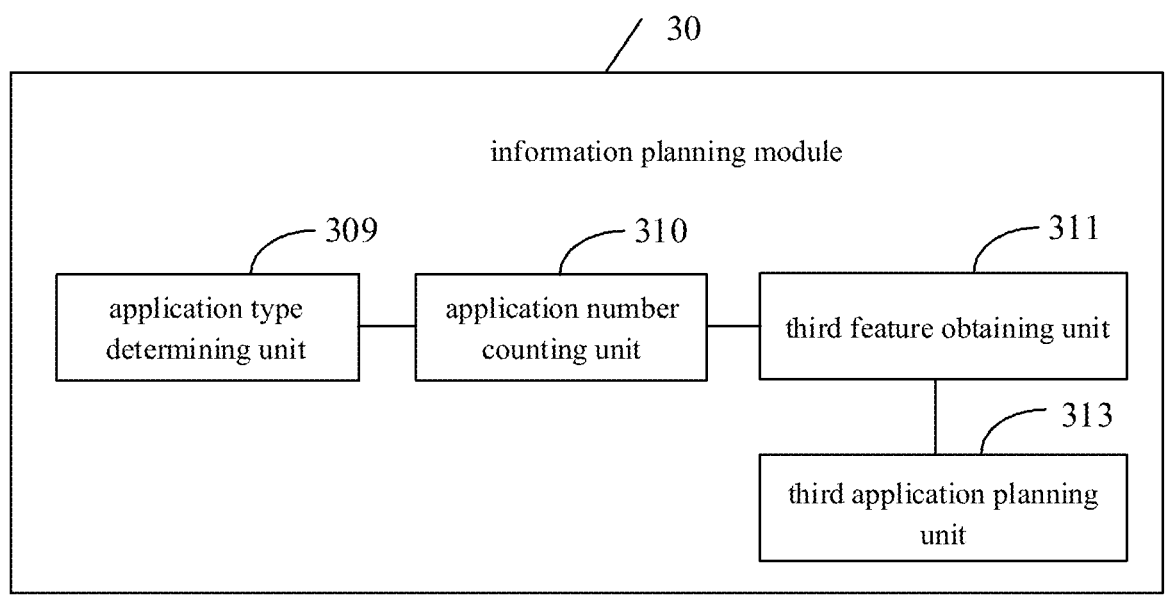
FIG. 12 is a block diagram of an information planning module according to yet another embodiment of the present disclosure.

Further referring to FIG. 12, FIG. 12 is a block diagram of an information planning module according to yet another embodiment of the present disclosure. As illustrated in FIG. 12, the information planning module 30 may include an application type determining unit 309, an application number counting unit 310, a third feature obtaining unit 311, and a third application planning unit 312.

The application type determining unit 309 is configured to, when the management rule corresponding to the desktop management request selected from the preset rule base is a quantity management rule, determine application types corresponding respectively to application names in the desktop application information, in which the quantity management rule includes preset interest feature information corresponding to a plurality of preset application types.

The application number counting unit 310 is configured to count numbers of applications corresponding to at least one of the application types related to the desktop application information and to take an application type corresponding to a greatest number of applications as a target application type, and to search for a target preset application type same with the target application type from the gender management rule.

The third feature obtaining unit 311 is configured to obtain preset interest feature information corresponding to the target preset application type from the quantity management rule as user interest feature information corresponding to the user information.

The third application planning unit 312 is configured to plan the desktop application information according to the user interest feature information to generate the desktop application arrangement information.

Detail implementation of the application type determining unit 309, the application number counting unit 310, the third feature obtaining unit 311, and the third application planning unit 312 may be found in descriptions of acts S402-S405 in above embodiments illustrated with reference to FIG. 4, thus will not be elaborated here.

Figure 13:
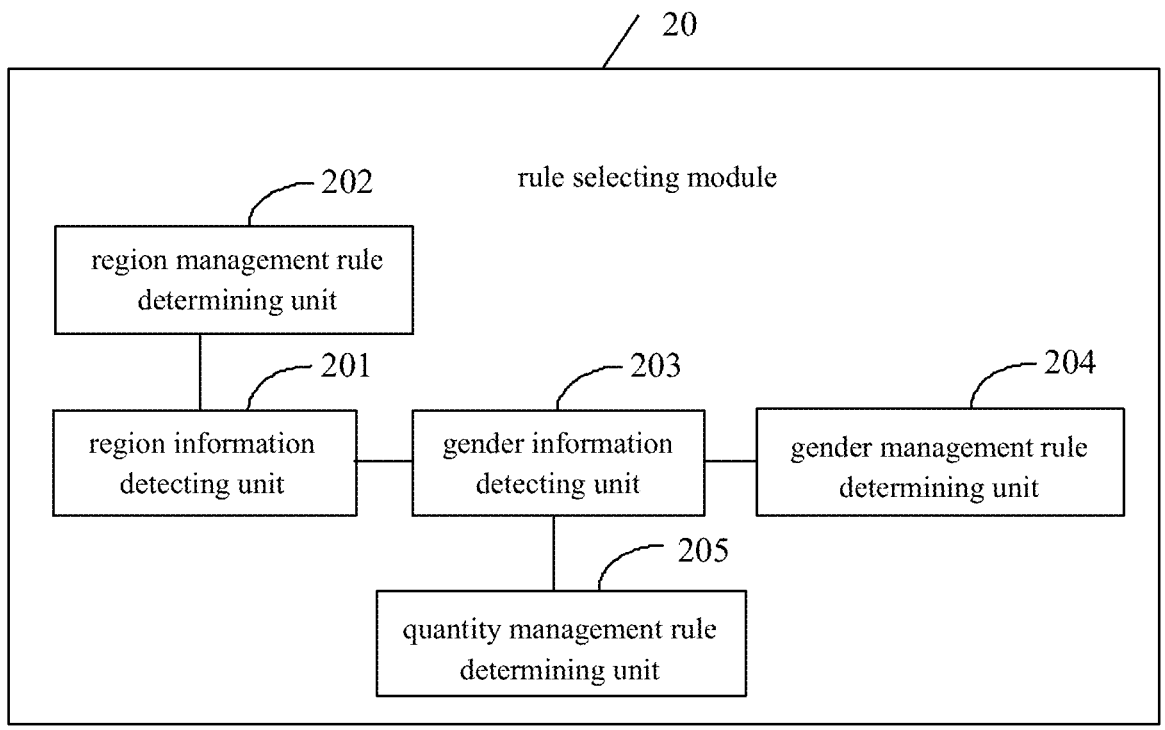
FIG. 13 is a block diagram of a rule selecting module according to an embodiment of the present disclosure.

Further referring to FIG. 13, FIG. 13 is a block diagram of a rule selecting module according to an embodiment of the present disclosure. As illustrated in FIG. 13, the rule selecting module 20 may include a region information detecting unit 201, a region management rule determining unit 202, a gender information detecting unit 203, a gender management rule determining unit 204 and a quantity management rule determining unit 205.

The region information detecting unit 201 is configured to detect whether the user region information is included in the user information.

The region management rule determining unit 202 is configured to, when the user region information is included in the user information, select a region management rule from the preset rule base as the management rule corresponding to the desktop management request.

The gender information detecting unit 203 is configured to, when the user region information is not included in the user information, detect whether user gender information is included in the user information.

The gender management rule determining unit 204 is configured to, when the user gender information is included in the user information, select a gender management rule from the preset rule base as the management rule corresponding to the desktop management request.

The quantity management rule determining unit 205 is configured to, when the user gender information is not included in the user information, select a quantity management rule from the preset rule base as the management rule corresponding to the desktop management request according to the desktop application information.

Detail implementation of the region information detecting unit 201, the region management rule determining unit 202, the gender information detecting unit 203, the gender management rule determining unit 204 and the quantity management rule determining unit 205 may be found in descriptions of acts S602-S605 in above embodiments illustrated with reference to FIG. 6, thus will not be elaborated here.

It can be seen from above embodiments that, first, the desktop management request sent by the mobile terminal is obtained by the apparatus for managing a desktop, in which the desktop management request carries the user information and the desktop application information; then the management rule corresponding to the desktop management request is selected from the preset rule base by the apparatus for managing a desktop; after that, the user interest feature information corresponding to the user information is analyzed according to the management rule, and the desktop application information is planned according to the user interest feature information to generate the desktop application arrangement information; at last, the desktop application arrangement information is sent to the mobile terminal, so that the mobile terminal arranges a plurality of application icons on the desktop according to the desktop application arrangement information. With the present disclosure, by selecting the management rule corresponding to the desktop management request from the preset rule base to enrich desktop icon arrangement patterns via different management rules, and by analyzing the user interest feature corresponding to the user information according to the management rule and further planning obtained desktop application information according to the user interest feature, the desktop application arrangement information which can satisfy the user interest feature may be generated. Therefore the mobile terminal may manage the layout of the application icons rapidly according to the desktop application arrangement information, thus enriching the desktop icon display effect and avoiding cumbersome manual layout operations.

Figure 14:
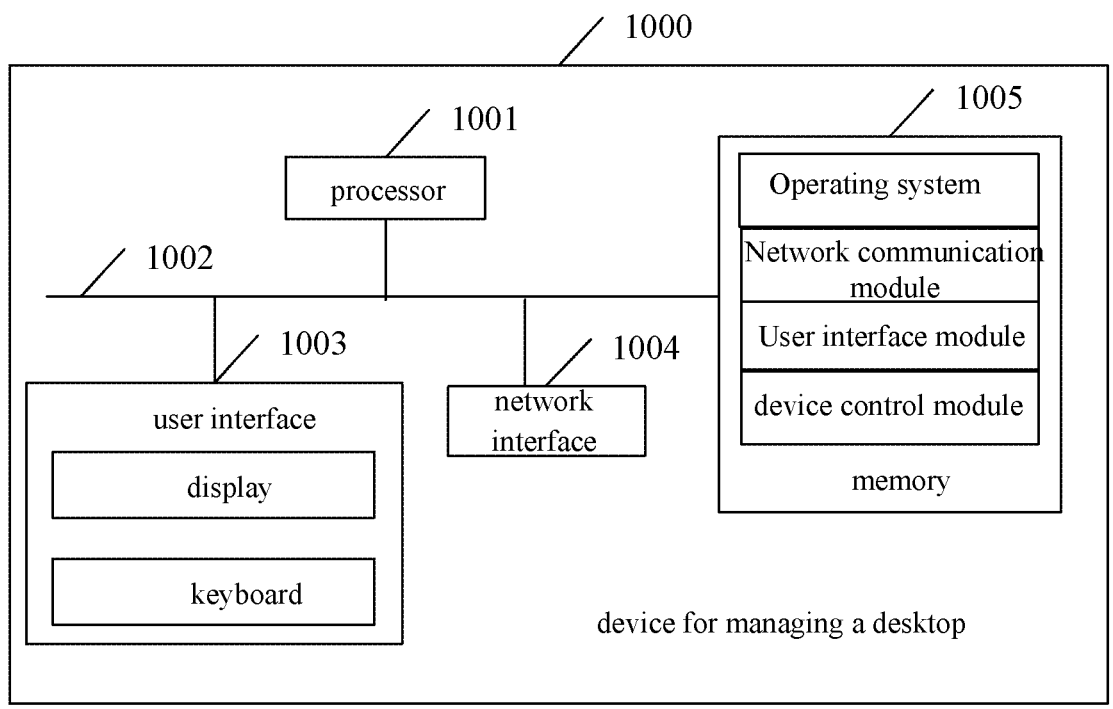
FIG. 14 is a block diagram of a device for managing a desktop according to yet another embodiment of the present disclosure.

Further referring to FIG. 14, FIG. 14 is a schematic diagram illustrating a device for managing a desktop according to an embodiment of the present disclosure. As illustrated in FIG. 14, the device 1000 for managing a desktop may be applied to the server described in above embodiments illustrated with reference to FIG. 1. The device 1000 for managing a desktop includes at least one processor 1001, for example a CPU; at least one network interface 1004, a user interface 1003, a memory 1005 and at least one communication bus 1002. The communication bus 1002 is configured to achieve communication and connection among these components. In detail, the user interface 1003 may include a display, and/or a keyboard, and/or may alternatively include a standard wire interface and/or a standard wireless interface. Alternatively, the network interface 1004 may include a standard wire interface and/or a standard wireless interface, for example a Wi-Fi interface. The memory 1005 may include a high-speed RAM memory and/or further include a non-volatile memory, for example at least one disk memory. Alternatively, the memory 1005 may include at least one memory device away from the above processor 1001. As illustrated in FIG. 14, the memory 1005, as a kind of computer storage medium, may include an operating system, a network communication module, a user interface module and a device control application program.

In the device 1000 for managing a desktop, the user interface 1003 is generally configured to provide an input interface for the user and to obtain data input by the user; and the processor 1001 is configured to run the device control application program stored in the memory 1005 to perform following acts of:

obtaining a desktop management request sent by a mobile terminal, the desktop management request carrying user information and desktop application information;

selecting a management rule corresponding to the desktop management request from a preset rule base;

analyzing user interest feature information corresponding to the user information according to the management rule, and planning the desktop application information according to the user interest feature information to generate desktop application arrangement information; and sending the desktop application arrangement information to the mobile terminal, such that the mobile terminal arranges a plurality of application icons on the desktop according to the desktop application arrangement information.

In an embodiment, the processor 1001 performing act of analyzing the user interest feature information corresponding to the user information according to the management rule, and planning the desktop application information according to the user interest feature information to generate the desktop application arrangement information includes:

when the management rule is a region management rule, extracting user region information from the user information, in which the region management rule includes a plurality pieces of preset interest feature information corresponding to a plurality pieces of preset region information;

searching for preset region information same with the user region information from the region management rule as target preset region information;

obtaining preset interest feature information corresponding to the target preset region information from the region management rule as the user interest feature information corresponding to the user information; and planning the desktop application information according to the user interest feature information to generate the desktop application arrangement information.

In an embodiment, the processor 1001 performing act of analyzing the user interest feature information corresponding to the user information according to the management rule, and planning the desktop application information according to the user interest feature information to generate the desktop application arrangement information includes:

when the management rule is a gender management rule, extracting user gender information from the user information, in which the gender management rule includes preset interest feature information corresponding to two types of preset gender information;

searching for preset gender information same with the user gender information from the gender management rule as target preset gender information;

obtaining preset interest feature information corresponding to the target preset gender information from the gender management rule as user interest feature information corresponding to the user information; and planning the desktop application information according to the user interest feature information to generate desktop application arrangement information.

In an embodiment, the processor 1001 performing act of when the management rule is a gender management rule, extracting the user gender information from the user information includes:

when the management rule is a gender management rule, detecting whether the user gender information is included in the user information;

when the user gender information is included in the user information, extracting the user gender information in the user information;

when the user gender information is not included in the user information, obtaining application name lists corresponding respectively to the two preset gender information and determining an application name list to which each application name in the desktop application information belongs; and predicting the user gender information corresponding to the user information according to the application name list to which each application name in the desktop application information belongs.

In an embodiment, the processor 1001 performing act of analyzing the user interest feature information corresponding to the user information according to the management rule, and planning the desktop application information according to the user interest feature information to generate the desktop application arrangement information includes:

when the management rule is a quantity management rule, determining application types corresponding respectively to application names in the desktop application information; in which, the quantity management rule includes preset interest feature information corresponding to a plurality of preset application types;

counting numbers of applications corresponding to at least one of the application types related to the desktop application information and taking an application type corresponding to a greatest number of applications as a target application type, and searching for a target preset application type same with the target application type from the gender management rule;

obtaining preset interest feature information corresponding to the target preset application type from the quantity management rule as user interest feature information corresponding to the user information; and planning the desktop application information according to the user interest feature information to generate the desktop application arrangement information.

In an embodiment, the processor 1001 performing act of selecting the management rule corresponding to the desktop management request from the preset rule base includes:

obtaining a user identification code in the user information; searching for a preset rule number matching the user identification code from the preset rule base; and obtaining a management rule corresponding to the preset rule number; in which, the preset rule base includes a plurality of management rules and each management rule corresponds to one preset rule number.

In an embodiment, the processor 1001 performing act of selecting the management rule corresponding to the desktop management request from the preset rule base includes:

detecting whether user region information is included in the user information;

when the user region information is included in the user information, selecting a region management rule from the preset rule base as the management rule corresponding to the desktop management request;

when the user region information is not included in the user information, detecting whether user gender information is included in the user information;

when the user gender information is included in the user information, selecting a gender management rule from the preset rule base as the management rule corresponding to the desktop management request; and when the user gender information is not included in the user information, selecting a quantity management rule from the preset rule base as the management rule corresponding to the desktop management request according to the desktop application information.

In an embodiment, the processor 1001 is further configured to perform acts of:

receiving desktop management application-uninstall information uploaded by the mobile terminal and count an application-uninstall quantity corresponding to each management rule in the rule base according to preset rule numbers of the management rules carried in the desktop management application-uninstall information;

taking a management rule with a greatest application-uninstall quantity as a first management rule and deleting the first management rule;

taking a management rule with a least application-uninstall quantity as a second management rule and reserving the second management rule; or combining a plurality of management rules together according to the application-uninstall quantities corresponding to the management rules to obtain a combined management rule.

It can be seen from above embodiments that, first, the desktop management request sent by the mobile terminal is obtained by the device 1000 for managing a desktop, in which the desktop management request carries the user information and the desktop application information; then the management rule corresponding to the desktop management request is selected from the preset rule base by the device for managing a desktop; after that, the user interest feature information corresponding to the user information is analyzed according to the management rule, and the desktop application information is planned according to the user interest feature information to generate the desktop application arrangement information; at last, the desktop application arrangement information is sent to the mobile terminal, so that the mobile terminal arranges a plurality of application icons on the desktop according to the desktop application arrangement information. With the present disclosure, by selecting the management rule corresponding to the desktop management request from the preset rule base to enrich desktop icon arrangement patterns via different management rules, and by analyzing the user interest feature corresponding to the user information according to the management rule and further planning the obtained desktop application information according to the user interest feature, the desktop application arrangement information which can satisfy the user interest feature may be generated. Therefore the mobile terminal may manage the layout of the application icons rapidly according to the desktop application arrangement information, thus enriching the desktop icon display effect and avoiding cumbersome manual layout operations.

In addition, it should to be noticed that the present disclosure further provides a computer readable storage medium; the storage medium is stored with a computer program executable by above device for managing a desktop. The computer program includes program instructions which when executed by a processor, performs the method for managing a desktop illustrated in above embodiments with reference to FIG. 1 to FIG. 6. Details will not be elaborated here. Moreover, when similar methods are involved, advantageous effects should be alike, thus will not be elaborated anymore. Undescribed details of the computer readable storage medium in the present disclosure may be found in descriptions of the method embodiments.

Those skilled in the art shall understand that all or parts of the steps in above method embodiments of the present disclosure may be achieved by commanding related hardware with a computer program, the program may be stored in a computer-readable storage medium and configured to perform procedures of the method embodiments when running on a processor. Wherein, the storage medium may include a disc, a CD, a read-only memory (ROM), or a random access memory (RAM), etc.

Although embodiments of present disclosure have been shown and described above, it should be understood that above embodiments are just explanatory, and cannot be construed to limit the present disclosure, changes, alternatives, and modifications can be made without departing from spirit, principles, and scope of the present disclosure.

What is claimed is:

1. A method for managing a desktop, comprising:
obtaining, by a server, a desktop management request sent by a mobile terminal, wherein the desktop management request carries user information and desktop application information;
selecting, by the server, a management rule corresponding to the desktop management request from a preset rule base including a plurality of management rules, each of the plurality of management rules including preset user interest feature information which includes at least one applicant type meeting user preferences;
searching target preset information corresponding to the user information or a target application type associated with the desktop application information from the management rule, and obtaining the user interest feature information corresponding to the target preset information or the target application type from the management rule and planning the desktop application information according to the user interest feature information to generate desktop application arrangement information; and
sending the desktop application arrangement information to the mobile terminal, such that the mobile terminal arranges a plurality of application icons on the desktop according to the desktop application arrangement information,
wherein, the user interest feature information includes priority information of the at least one application type, and the application arrangement information includes information for arranging the plurality of application icons on the desktop, and
wherein, the user information includes information that is predicted according to respective application names in the desktop application information,
wherein, obtaining the user interest feature information corresponding to the target preset information or the target application type from the management rule and planning the desktop application information according to the user interest feature information to generate the desktop application arrangement information, comprises:

when the management rule is a gender management rule, extracting user gender information from the user information, wherein the gender management rule comprises preset interest feature information corresponding to two types of preset gender information;
searching for preset gender information same with the user gender information from the gender management rule as target preset gender information;
obtaining preset interest feature information corresponding to the target preset gender information from the gender management rule as the user interest feature information corresponding to the user information; and
planning the desktop application information according to the user interest feature information to generate the desktop application arrangement information, and
wherein, when the management rule is the gender management rule, extracting the user gender information from the user information comprises:
when the management rule is the gender management rule, detecting whether the user gender information is included in the user information;
when the user gender information is included in the user information, extracting the user gender information in the user information;
when the user gender information is not included in the user information, obtaining application name lists corresponding respectively to the two types of preset gender information and determining an application name list to which each application name in the desktop application information belongs; and
predicting the user gender information corresponding to the user information according to the application name list to which each application name in the desktop application information belongs.

2. The method according to claim 1, wherein, obtaining the user interest feature information corresponding to the target preset information or the target application type from the management rule and planning the desktop application information according to the user interest feature information to generate the desktop application arrangement information, comprises:
when the management rule is a region management rule, extracting user region information from the user information, wherein the region management rule comprises a plurality pieces of preset interest feature information corresponding to a plurality pieces of preset region information;
searching for preset region information same with the user region information from the region management rule as target preset region information;
obtaining preset interest feature information corresponding to the target preset region information from the region management rule as the user interest feature information corresponding to the user information; and
planning the desktop application information according to the user interest feature information to generate the desktop application arrangement information.

3. The method according to claim 1, wherein, obtaining the user interest feature information corresponding to the target preset information or the target application type from the management rule and planning the desktop application information according to the user interest feature information to generate the desktop application arrangement information, comprises:
when the management rule is a quantity management rule, determining application types corresponding respectively to application names in the desktop application information; wherein, the quantity management rule comprises preset interest feature information corresponding to a plurality of preset application types;
counting numbers of applications corresponding to at least one of the application types related to the desktop application information and taking an application type corresponding to a greatest number of applications as a target application type, and searching for a target preset application type same with the target application type from the quantity management rule;
obtaining preset interest feature information corresponding to the target preset application type from the quantity management rule as the user interest feature information corresponding to the user information; and
planning the desktop application information according to the user interest feature information to generate the desktop application arrangement information.

4. The method according to claim 1, wherein, selecting, by the server, the management rule corresponding to the desktop management request from the preset rule base comprises:
obtaining, by the server, a user identification code in the user information, searching for a preset rule number matching the user identification code from the preset rule base and obtaining a management rule corresponding to the preset rule number, wherein, the preset rule base comprises a plurality of management rules and each management rule corresponds to one preset rule number.

5. The method according to claim 1, wherein, selecting, by the server, the management rule corresponding to the desktop management request from the preset rule base comprises:
detecting, by the server, whether user region information is included in the user information;
when the user region information is included in the user information, selecting a region management rule from the preset rule base as the management rule corresponding to the desktop management request;
when the user region information is not included in the user information, detecting whether user gender information is included in the user information;
when the user gender information is included in the user information, selecting a gender management rule from the preset rule base as the management rule corresponding to the desktop management request; and
when the user gender information is not included in the user information, selecting a quantity management rule from the preset rule base as the management rule corresponding to the desktop management request according to the desktop application information.

6. The method according to claim 1, further comprising:
receiving, by the server, desktop management application-uninstall information uploaded by the mobile terminal and count an application-uninstall quantity corresponding to each management rule in the rule base according to preset rule numbers of the management rules carried in the desktop management application-uninstall information;
taking a management rule with a greatest application-uninstall quantity as a first management rule and deleting the first management rule;
taking a management rule with a least application-uninstall quantity as a second management rule and reserving the second management rule; or
combining a plurality of management rules together according to the application-uninstall quantities corresponding to the management rules to obtain a combined management rule.

7. A device for managing a desktop, comprising a processor, a network interface, and a memory, wherein:
the processor is connected to the network interface and the memory, the network interface is configured to communicate with a mobile terminal, the memory is configured to store program codes, and the processor is configured to call the program codes to perform following acts of:
obtaining a desktop management request sent by the mobile terminal, wherein the desktop management request carries user information and desktop application information;
selecting, by the server, a management rule corresponding to the desktop management request from a preset rule base including a plurality of management rules, each of the plurality of management rules including preset user interest feature information which includes at least one applicant type meeting user preferences;
searching target preset information corresponding to the user information or a target application type associated with the desktop application information from the management rule, and obtaining the user interest feature information corresponding to the target preset information or the target application type from the management rule and planning the desktop application information according to the user interest feature information to generate desktop application arrangement information; and
sending the desktop application arrangement information to the mobile terminal, such that the mobile terminal arranges a plurality of application icons on the desktop according to the desktop application arrangement information,
wherein, the user interest feature information includes priority information of the at least one application type, and the application arrangement information includes information for arranging the plurality of application icons on the desktop, and
wherein, the user information includes information that is predicted according to respective application names in the desktop application information,
wherein the processor is configured to obtain the user interest feature information corresponding to the target preset information or the target application type from the management rule and to plan the desktop application information according to the user interest feature information to generate the desktop application arrangement information by acts of:
when the management rule is a gender management rule, extracting user gender information from the user information, wherein the gender management rule comprises preset interest feature information corresponding to two types of preset gender information;
searching for preset gender information same with the user gender information from the gender management rule as target preset gender information;
obtaining preset interest feature information corresponding to the target preset gender information from the gender management rule as the user interest feature information corresponding to the user information; and
planning the desktop application information according to the user interest feature information to generate the desktop application arrangement information, and wherein, the processor is configured to extract the user gender information from the user information when the management rule is the gender management rule by acts of:
when the management rule is the gender management rule, detecting whether the user gender information is included in the user information;
when the user gender information is included in the user information, extracting the user gender information in the user information;
when the user gender information is not included in the user information, obtaining application name lists corresponding respectively to the two types of preset gender information and determining an application name list to which each application name in the desktop application information belongs; and
predicting the user gender information corresponding to the user information according to the application name list to which each application name in the desktop application information belongs.

8. The device according to claim 7, wherein the processor is configured to obtain the user interest feature information corresponding to the target preset information or the target application type from the management rule and to plan the desktop application information according to the user interest feature information to generate the desktop application arrangement information by acts of:
when the management rule is a region management rule, extracting user region information from the user information, wherein the region management rule comprises a plurality pieces of preset interest feature information corresponding to a plurality pieces of preset region information;
searching for preset region information same with the user region information from the region management rule as target preset region information;
obtaining preset interest feature information corresponding to the target preset region information from the region management rule as the user interest feature information corresponding to the user information; and
planning the desktop application information according to the user interest feature information to generate the desktop application arrangement information.

9. The device according to claim 7, wherein the processor is configured to obtain the user interest feature information corresponding to the target preset information or the target application type from the management rule and to plan the desktop application information according to the user interest feature information to generate the desktop application arrangement information by acts of:
when the management rule is a quantity management rule, determining application types corresponding respectively to application names in the desktop application information; wherein, the quantity management rule comprises preset interest feature information corresponding to a plurality of preset application types;
counting numbers of applications corresponding to at least one of the application types related to the desktop application information and taking an application type corresponding to a greatest number of applications as a target application type, and searching for a target preset application type same with the target application type from the quantity management rule;
obtaining preset interest feature information corresponding to the target preset application type from the quantity management rule as the user interest feature information corresponding to the user information; and
planning the desktop application information according to the user interest feature information to generate the desktop application arrangement information.

10. The device according to claim 7, wherein the processor is configured to select the management rule corresponding to the desktop management request from the preset rule base by acts of:
obtaining a user identification code in the user information, searching for a preset rule number matching the user identification code from the preset rule base and obtaining a management rule corresponding to the preset rule number, wherein, the preset rule base comprises a plurality of management rules and each management rule corresponds to one preset rule number.

11. The device according to claim 7, wherein the processor is configured to select the management rule corresponding to the desktop management request from the preset rule base by acts of:
detecting whether user region information is included in the user information;
when the user region information is included in the user information, selecting a region management rule from the preset rule base as the management rule corresponding to the desktop management request;
when the user region information is not included in the user information, detecting whether user gender information is included in the user information;
when the user gender information is included in the user information, selecting a gender management rule from the preset rule base as the management rule corresponding to the desktop management request; and
when the user gender information is not included in the user information, selecting a quantity management rule from the preset rule base as the management rule corresponding to the desktop management request according to the desktop application information.

12. The device according to claim 7, wherein the processor is further configured to call the program codes to perform following acts of:
receiving desktop management application-uninstall information uploaded by the mobile terminal and count an application-uninstall quantity corresponding to each management rule in the rule base according to preset rule numbers of the management rules carried in the desktop management application-uninstall information;
taking a management rule with a greatest application-uninstall quantity as a first management rule and deleting the first management rule;
taking a management rule with a least application-uninstall quantity as a second management rule and reserving the second management rule; or
combining a plurality of management rules together according to the application-uninstall quantities corresponding to the management rules to obtain a combined management rule.

13. A non-transitory computer-readable storage medium, stored with a computer program which comprising program instructions that, when executed by a processor, performs a method managing a desktop, the method comprising:
obtaining a desktop management request sent by a mobile terminal, wherein the desktop management request carries user information and desktop application information;
selecting, by the server, a management rule corresponding to the desktop management request from a preset rule base including a plurality of management rules, each of the plurality of management rules including preset user interest feature information which includes at least one applicant type meeting user preferences;

searching target preset information corresponding to the user information or a target application type associated with the desktop application information from the management rule, and obtaining the user interest feature information corresponding to the target preset information or the target application type from the management rule and planning the desktop application information according to the user interest feature information to generate desktop application arrangement information; and sending the desktop application arrangement information to the mobile terminal, such that the mobile terminal arranges a plurality of application icons on the desktop according to the desktop application arrangement information, wherein, the user interest feature information includes priority information of the at least one application type, and the application arrangement information includes information for arranging the plurality of application icons on the desktop, and wherein, the user information includes information that is predicted according to respective application names in the desktop application information, wherein, obtaining the user interest feature information corresponding to the target preset information or the target application type from the management rule and planning the desktop application information according to the user interest feature information to generate the desktop application arrangement information, comprises:

when the management rule is a gender management rule, extracting user gender information from the user information, wherein the gender management rule comprises preset interest feature information corresponding to two types of preset gender information;

searching for preset gender information same with the user gender information from the gender management rule as target preset gender information;

obtaining preset interest feature information corresponding to the target preset gender information from the gender management rule as the user interest feature information corresponding to the user information; and planning the desktop application information according to the user interest feature information to generate the desktop application arrangement information, wherein, when the management rule is the gender management rule, extracting the user gender information from the user information comprises:

when the management rule is the gender management rule, detecting whether the user gender information is included in the user information;

when the user gender information is included in the user information, extracting the user gender information in the user information;

when the user gender information is not included in the user information, obtaining application name lists corresponding respectively to the two types of preset gender information and determining an application name list to which each application name in the desktop application information belongs; and predicting the user gender information corresponding to the user information according to the application name list to which each application name in the desktop application information belongs.

14. The non-transitory computer-readable storage medium according to claim 13, wherein, obtaining the user interest feature information corresponding to the target preset information or the target application type from the management rule and planning the desktop application information according to the user interest feature information to generate the desktop application arrangement information, comprises:

when the management rule is a region management rule, extracting user region information from the user information, wherein the region management rule comprises a plurality pieces of preset interest feature information corresponding to a plurality pieces of preset region information;

searching for preset region information same with the user region information from the region management rule as target preset region information;

obtaining preset interest feature information corresponding to the target preset region information from the region management rule as the user interest feature information corresponding to the user information; and planning the desktop application information according to the user interest feature information to generate the desktop application arrangement information.

15. The non-transitory computer-readable storage medium according to claim 13, wherein, obtaining the user interest feature information corresponding to the target preset information or the target application type from the management rule and planning the desktop application information according to the user interest feature information to generate the desktop application arrangement information, comprises:

when the management rule is a quantity management rule, determining application types corresponding respectively to application names in the desktop application information; wherein, the quantity management rule comprises preset interest feature information corresponding to a plurality of preset application types;

counting numbers of applications corresponding to at least one of the application types related to the desktop application information and taking an application type corresponding to a greatest number of applications as a target application type, and searching for a target preset application type same with the target application type from the quantity management rule;

obtaining preset interest feature information corresponding to the target preset application type from the quantity management rule as the user interest feature information corresponding to the user information; and planning the desktop application information according to the user interest feature information to generate the desktop application arrangement information.

* * * * *